(12) United States Patent
Prest et al.

(10) Patent No.: US 11,909,552 B2
(45) Date of Patent: Feb. 20, 2024

(54) SYSTEMS AND METHODS FOR COMMUNICATING WITH PAYLOAD ON AN UNMANNED VEHICLE

(71) Applicant: FLIR Unmanned Aerial Systems ULC, Vancouver (CA)

(72) Inventors: Christopher E. Prest, Waterloo (CA); David D. Kroetsch, Waterloo (CA); Michael Peasgood, Waterloo (CA); Jerry Mailloux, Waterloo (CA); Eason J. Choo, Waterloo (CA)

(73) Assignee: FLIR Unmanned Aerial Systems ULC, Vancouver (CA)

( * ) Notice: Subject to any disclaimer, the term of this patent is extended or adjusted under 35 U.S.C. 154(b) by 140 days.

(21) Appl. No.: 17/079,376

(22) Filed: Oct. 23, 2020

(65) Prior Publication Data

US 2021/0058267 A1 Feb. 25, 2021

Related U.S. Application Data

(63) Continuation of application No. PCT/CA2019/050527, filed on Apr. 25, 2019.

(Continued)

(51) Int. Cl.
*H04L 12/40* (2006.01)
*H04L 45/74* (2022.01)
(Continued)

(52) U.S. Cl.
CPC ............ *H04L 12/40* (2013.01); *H04L 45/74* (2013.01); *H04L 47/24* (2013.01); *H04L 63/08* (2013.01);
(Continued)

(58) Field of Classification Search
None
See application file for complete search history.

(56) References Cited

U.S. PATENT DOCUMENTS

| 8,020,657 | B2 * | 9/2011 | Allard | G05D 1/0088 |
| | | | | 180/167 |
| 8,473,140 | B2 * | 6/2013 | Norris | H04L 67/12 |
| | | | | 701/23 |

(Continued)

OTHER PUBLICATIONS

EN-SCI-271-03.pdf STANAG 4586—Standard Interfaces of UAV Control System (UCS) for NATO UAV Interoperability-STANAG 4586 Ed.3, NATO Standardization Agency (NSA), Nov. 30, 2012 (30-1 (Year: 2012).*

*Primary Examiner* — Kodzovi Acolatse
*Assistant Examiner* — Anindita Sen
(74) *Attorney, Agent, or Firm* — Haynes and Boone, LLP

(57) ABSTRACT

An unmanned vehicle (UV) is provided for transmitting data to a payload device connected to the UV. The UV comprises a processor configured to control operations of the UV, a first and a second communication interface for connecting to a payload device, a third communication interface for communicating with a remote station, and a non-transitory memory device storing instructions configured to cause the processor to to receive and transmit data. The processor is configured to receive one or more data packets through the third communication interface from the remote station, transmit the one or more data packets to the payload device through the first communication interface when the one or more data packets are designated for the first communication interface, and transmit the one or more data packets to the payload device through the second communication interface when the one or more data packets are designated for the second communication interface.

20 Claims, 9 Drawing Sheets

Related U.S. Application Data

(60) Provisional application No. 62/662,464, filed on Apr. 25, 2018.

(51) Int. Cl.
  *H04L 47/24* (2022.01)
  *H04L 9/40* (2022.01)

(52) U.S. Cl.
  CPC .. *H04L 63/0428* (2013.01); *H04L 2012/4028* (2013.01)

(56) References Cited

U.S. PATENT DOCUMENTS

| | | | | |
|---|---|---|---|---|
| 8,874,300 | B2* | 10/2014 | Allard | G05B 19/414 |
| | | | | 701/28 |
| 9,043,016 | B2* | 5/2015 | Filippov | G05B 19/414 |
| | | | | 700/245 |
| 9,100,361 | B1* | 8/2015 | Lucchesi | H04L 63/00 |
| 11,328,087 | B1* | 5/2022 | Allen | H04L 9/0861 |
| 2005/0117605 | A1* | 6/2005 | Yan | H04L 65/1101 |
| | | | | 370/469 |
| 2007/0198144 | A1* | 8/2007 | Norris | G05D 1/021 |
| | | | | 701/23 |
| 2010/0058082 | A1* | 3/2010 | Locker | G06F 1/3209 |
| | | | | 713/320 |
| 2011/0035149 | A1* | 2/2011 | McAndrew | G08G 5/006 |
| | | | | 701/466 |
| 2012/0008619 | A1* | 1/2012 | Wang | H04L 63/029 |
| | | | | 370/352 |
| 2015/0236904 | A1* | 8/2015 | Tsui | H04L 41/0846 |
| | | | | 709/222 |
| 2017/0295069 | A1* | 10/2017 | Sweet, III | H04B 7/18504 |
| 2017/0353492 | A1* | 12/2017 | Wick | H04L 41/145 |
| 2018/0375568 | A1* | 12/2018 | De Rosa | H04B 7/18506 |
| 2019/0058613 | A1* | 2/2019 | Maeda | G06F 13/4221 |
| 2019/0185162 | A1* | 6/2019 | Prager | G05D 1/101 |
| 2019/0335551 | A1* | 10/2019 | Williams | H05B 45/24 |
| 2020/0120563 | A1* | 4/2020 | Takács | H04B 7/18506 |
| 2021/0116907 | A1* | 4/2021 | Altman | H04W 4/44 |
| 2021/0127271 | A1* | 4/2021 | Wu | H04W 12/0471 |
| 2021/0297921 | A1* | 9/2021 | Pragada | H04W 36/32 |
| 2022/0148434 | A1* | 5/2022 | Vivanco | H04W 36/32 |

* cited by examiner

SYSTEMS AND METHODS FOR COMMUNICATING WITH PAYLOAD ON AN UNMANNED VEHICLE

CROSS-REFERENCE TO RELATED APPLICATIONS

This patent application is a continuation of International Patent Application No. PCT/CA2019/050527 filed Apr. 25, 2019 and entitled "Systems and Methods for Communicating With Payload on an Unmanned Vehicle," which is hereby incorporated by reference in its entirety International Patent Application No. PCT/CA2019/050527 filed Apr. 25, 2019 claims all benefit including priority to United States Provisional Patent Application 62/662,464, filed Apr. 25, 2018, and entitled: "Systems and Methods for Communicating with Payload on an Unmanned Aerial Vehicle," which is hereby incorporated by reference in its entirety.

FIELD

This disclosure generally relates to the field of unmanned vehicles, and in particular to communication with an unmanned vehicle and its payload.

BACKGROUND

An unmanned aerial vehicle (UAV) does not have a human operator located at the UAV. A UAV may include various components such as sensors and measurement and navigation instruments. A UAV may carry a payload which may be configured to perform specific duties such delivering packages or taking aerial photographs and videos. Often times when a payload is designed to be used with a UAV, the manufacturer of either the UAV or the payload would need to spend considerable amount of time and resources on customizing the hardware and software of the payload and/or the UAV (e.g., a driver program on UAV for the payload), so a user can control or communicate with the payload or the UAV via the remote control station or device while the payload is in the air. It is desirable to allow a user to communicate or control a payload in the air without requiring extensive customization of the hardware and software of the payload and UAV.

Accordingly, there exists a need for an improved communication with payloads on UAVs, or at least an alternative.

SUMMARY

In accordance with one aspect, there is provided an unmanned vehicle (UV). The UV comprises a processor configured to control operations of the UV, a first communication interface and a second communication interface for connecting to a payload device, the first and second communication interfaces being of different types from each other, a third communication interface for communicating with a remote station, and a non-transitory memory device storing machine-readable instructions that, when executed by the processor, causes the processor to receive and transmit data. The processor is configured to receive through the third communication interface one or more data packets from the remote station, transmit the one or more data packets to the payload device through the first communication interface when the one or more data packets are designated for the first communication interface, and transmit the one or more data packets to the payload device through the second communication interface when the one or more data packets are designated for the second communication interface.

In accordance with another aspect, a process for receiving and transmitting data by an unmanned vehicle (UV) is provided. The UV comprises a first communication interface and a second communication interface for connecting to a payload device, and a third communication interface for communicating with a remote station. The first and second communication interfaces are of different types from each other. The process comprises receiving through the third communication interface one or more data packets from the remote station, transmitting the one or more data packets to the payload device through the first communication interface when the one or more data packets are designated for the first communication interface, and transmitting the one or more data packets to the payload device through the second communication interface when the one or more data packets are designated for the second communication interface.

In accordance with one aspect, a remote station may be provided. The remote station comprises a processor, a communication interface for communicating with an unmanned vehicle (UV), and a non-transitory memory device storing machine-readable instructions that, when executed by the processor, cause the processor to receive and transmit data. The processor is configured to receive or retrieve an input, process the input into one or more data packets for transmission to a payload device through the UV when the input is for the payload device connected to the UV, and transmit the one or more data packets to the UV through the communication interface for delivery to the payload device. The payload device is connected to the UV through at least two communication interfaces. The two communication interfaces are of different types from each other.

In accordance with another aspect, a software development kit (SDK) may be provided. The SDK may be stored on a non-transitory computer readable medium for developing software applications for controlling an unmanned vehicle (UV) and a payload device connected to the UV. The UV may comprise a UAV, UGV, unmanned aquatic vehicle, or any robotic structure (including a fixed structure). The SDK comprises a first application programming interface (API) utilized in developing software applications at a remote station, and a second API utilized in developing the software applications at a remote station. The first API is configured to access the UV to obtain information regarding the UV. The second API is configured to access the payload device to obtain information regarding the payload device. The second API is configured to access the payload device through a communication interface between the remote station and the UV.

In various further aspects, the disclosure provides corresponding systems and devices, and logic structures such as machine-executable coded instruction sets for implementing such systems, devices, and methods.

In this respect, before explaining at least one embodiment in detail, it is to be understood that the embodiments are not limited in application to the details of construction and to the arrangements of the components set forth in the following description or illustrated in the drawings. Also, it is to be understood that the phraseology and terminology employed herein are for the purpose of description and should not be regarded as limiting.

Many further features and combinations thereof concerning embodiments described herein will appear to those skilled in the art following a reading of the instant disclosure.

DESCRIPTION OF THE FIGURES

Embodiments will be described, by way of example only, with reference to the attached figures, wherein in the figures.

It is understood that throughout the description and figures, like features are identified by like reference numerals.

DETAILED DESCRIPTION

It will be appreciated that numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description is not to be considered as limiting the scope of the embodiments described herein in any way, but rather as merely describing implementation of the various example embodiments described herein.

The term unmanned vehicle (UV) is used herein and may include an unmanned aerial vehicle (UAV), an unmanned aircraft (UA), an unmanned aquatic vessel, an unmanned ground vehicle (UGV), and any other vehicle or structure which maybe unmanned, operate autonomously or semi-autonomously, and/or controlled remotely. The UGV may be a remotely controlled, autonomous or semi-autonomous vehicle system which is comprised of a main body and a drive system supported by the main body. In some examples, the drive system is comprised of a propulsion system, such as a motor or engine, and one or more tracks or wheels. Other arrangements, such as a rail or fixed-track ground vehicle, a tether or rope-pulled ground vehicle without a motor or engine, a ground vehicle using balls, sleds or rails, and a ground vehicle which hovers but navigates in proximity to terrain, are also contemplated herein.

Some of the features taught herein are described with reference to embodiments of a UAV by way of example only. However, the description and features may also apply generally to any UV.

Figure 1:
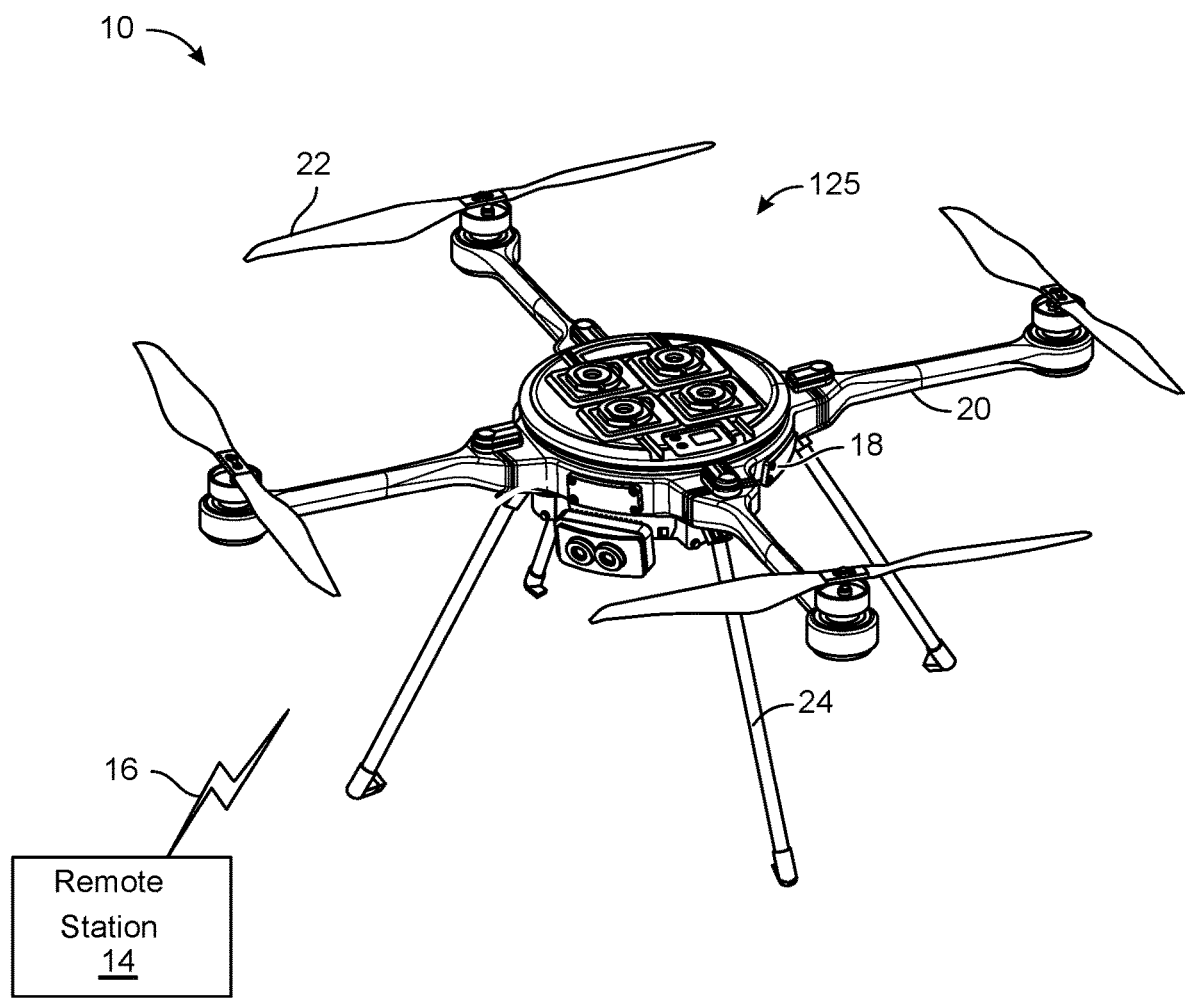
FIG. 1 is a schematic view of an example system for an UV, in accordance with some embodiments.

FIG. 1 illustrates an unmanned system (US) 10 (such as an unmanned aircraft system) comprising an unmanned vehicle (UV) 125 (such as an unmanned aerial vehicle) and its associated system elements. UV 125 is designed to operate with no operator (or pilot) onboard. In the embodiment shown in FIG. 1, the unmanned system 10 includes a remote operator (or pilot) station 14 and command and control links 16 between UV 125 and remote operator (or pilot) station 14. The command and control links 16 may include any data link for the purposes of managing the travel or movement (e.g., flight) of UV 125. UV 125 may operate autonomously without operator (e.g., pilot) intervention in the management of the travel or movement (e.g., flight) during the entire travel or movement (e.g., flight) operation or a portion thereof. The unmanned system 10 may also include other system elements as may be required at any point during travel or movement (e.g., flight) operation.

In some embodiments, UV 125 may be an unmanned aircraft (UA) or UAV as shown in FIG. 1.

The example UV 125 shown in FIG. 1 comprises a UAV that includes a body 18, arms 20 extending away from the body 18 to support components such as propellers 22, and legs 24 to support the body 18 when UV 125 is positioned on a surface. Although four arms 20 and four legs 24 are illustrated in the embodiment shown in FIG. 1, it is understood that UV 125 may include any other number of arms 20 and legs 24. As noted above, the example of FIG. 1 pertains to a UAV by way of example only. Similarly, the examples herein refer to UAVs. Other types of UVs may also employ the teachings described herein. As such, the terms UV or UAV 125 may be used. In some embodiments, the UV or UAV may be a fixed-wing UAV.

In some embodiments, remote pilot (or operator) station 14 may comprise a ground station. In other embodiments, remote pilot (or operator) station 14 may comprise a client device acting as a control station. In still other embodiments, remote pilot (or operator) station 14 may comprise both a ground station and a client device.

Figure 2:
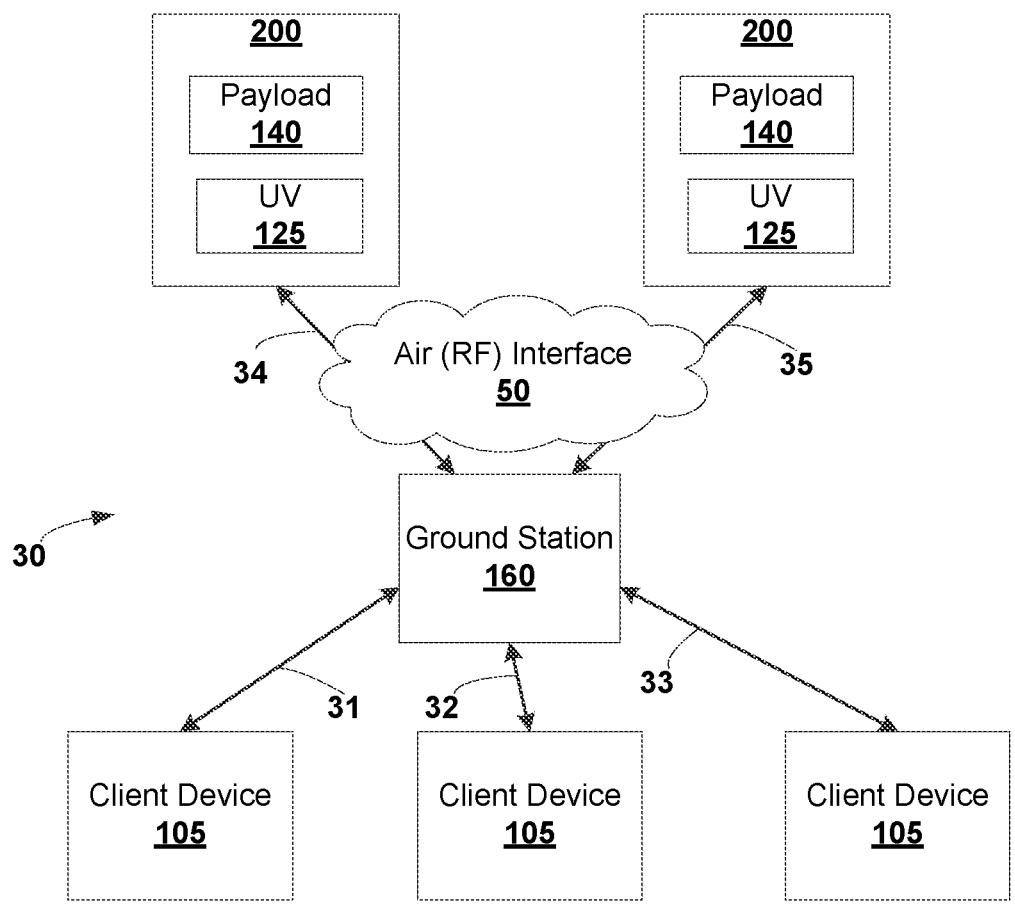
FIG. 2 is a schematic block diagram of an example system of UVs or UAVs in communication with a ground station and client devices, in accordance with some embodiments.

FIG. 2 shows an example system 30 including one or more loaded vehicle 200, a ground station 160, and one or more client devices 105. System 30 may include more than one ground stations 160. A loaded vehicle 200 may include an UV or UAV 125 and a payload 140. Ground station 160 may communicate with one or more loaded vehicles 200 via air interface 50, which may include satellite communication 34 or other types of radio frequency communication 35 between station 160 and loaded vehicles 200. Ground station 160 may communicate with one or more client devices 105 through a number of communication links and network interfaces, such as a wired or wireless local area network 31, a cellular network 32 (such as Global System for Mobile Communications (GSM), Long-Term Evolution (LTE), Fifth Generation (5G), or any other cellular networks), or a proprietary or private radio link 33.

A loaded vehicle 200 may include an UV or UAV 125 and a payload 140. The payload 140 may include one or more of: a freight package, a camera, a measuring device, one or more sensors, and a storage device (e.g., Universal Serial Bus (USB) drive). A payload 140 can also include, for example, flame retardant for use in a forest fire. Generally speaking, a payload 140 may be any cargo or equipment an UV or UAV 125 carries that is not necessarily required for flight, control, movement, transportation and/or navigation of the UV or UAV itself. A payload 140 may be attached or coupled to UV or UAV 125 in a number of ways. For example, a payload 140 may be connected to UV or UAV 125 by one or more interfaces such as, but not limited to, Ethernet connection, Controller Area Network (CAN) Bus connection, serial connection, Inter-integrated Circuit (I²C) connection, printed circuit board (PCB) interfaces, USB connection, a proprietary physical link, and so on. In some embodiments, the payload 140 may be connected to the UV or UAV 125 by a wireless connection such as, but not limited to, Bluetooth, WiFi, or any other wireless protocol.

Ground station 160 may be configured to communicate with one or more loaded vehicles 200 (or simply "vehicles 200" hereinafter). Ground station 160 may also communicate with UVs or UAVs not carrying any payload. Ground station 160 may control one or more loaded vehicles 200, one or more UVs or UAVs 125, one or more payloads 140 concurrently in real time or near real time. Ground station 160 may also receive commands and/or data from one or more client devices 105, process the commands or data, and transmit the processed commands or data to one or more vehicles 200, UVs or UAVs 125, or payloads 140. In some embodiments, ground station 160 may receive user input directly without client devices 105.

Client device 105 may serve to control the operation of one or more vehicles 200, UVs or UAVs 125, or payloads 140 remotely. In some embodiments, a client device 105 may also be referred to as a control station. Client device 105 may be implemented as a computing device.

A user, such as an owner or operator of an UV or UAV 125, may use client device 105 to communicate with and control one or more vehicles 200, UVs or UAVs 125, or payloads 140. A client device 105 may have an application implemented for communicating with or controlling vehicles 200, UVs or UAVs 125, or payloads 140. Such an application may be launched as a stand-alone process in a standard operation system (e.g., Windows™ or Solaris™), or within a standard browser (e.g., Internet Explorer™ or Chrome™). The user may enter information through an user interface provided by the application. In addition, information relating to or from the vehicle 200, UV or UAV 125, or payload 140 may be displayed by the application on a display of client device 105. Client device 105 may communicate with or control vehicle 200, UV or UAV 125, or payload 140 through ground station 160, or in some embodiments, client device 105 may communicate with or control vehicle 200, UV or UAV 125, or payload 140 directly without ground station 160.

In some embodiments, client device 105 is operable to register and authenticate users (using a login, unique identifier, biometric information or password for example) prior to providing access to loaded vehicles, payloads, UVs or UAVs, applications, a local network, network resources, other networks and network security devices. Client device 105 may serve one user or multiple users.

In some embodiments, communication hardware and communication links (e.g., communication links 31, 32, 33) may include a network interface to enable computing device to communicate with other components, to exchange data with other components, to access and connect to network resources, to serve applications, and perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g., Wi-Fi, WiMAX), SS7 signaling network, fixed line, local area network, wide area network, and others, including any combination of these.

Either or both of ground station 160 and client device 105 may be configured to control vehicle 200, UV or UAV 125, or payload 140. Flight control, travel control, navigation control, movement, transportation, and other types of command signals may be transmitted to UV or UAV 125 for controlling or navigating one or more of vehicle 200, UV or UAV 125, or payload 140. Command signals may include command data (e.g., coordinate information) required to execute travel control, flight control, movement control or navigation control of one or more of vehicle 200, UV or UAV 125, or payload 140.

Either or both of ground station 160 and client device 105 may be configured to receive data from one or more of vehicle 200, UV or UAV 125, or payload 140. For example, payload 140 may transmit audio, video or photographs to ground station 160 or client device 105.

Figure 3:
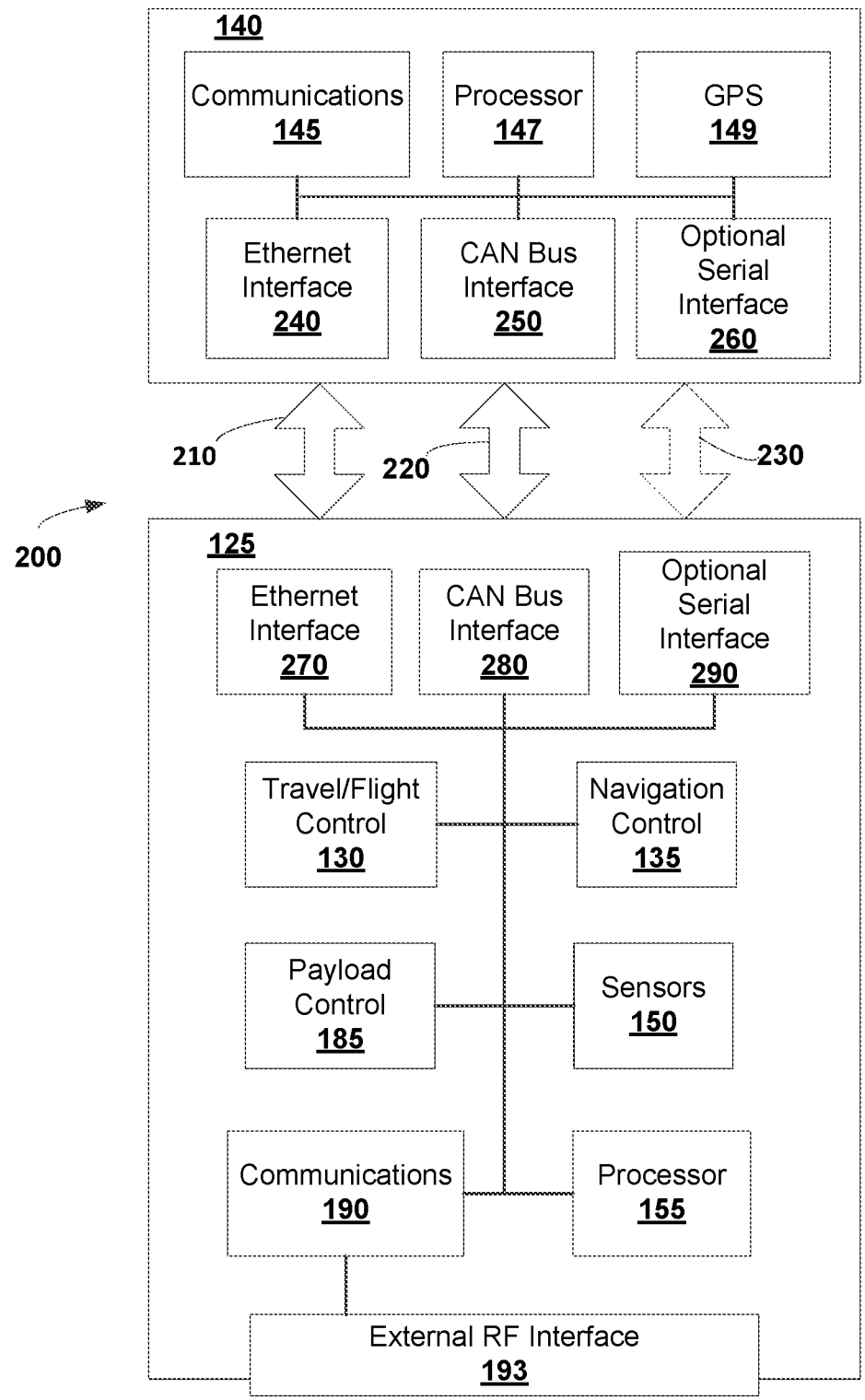
FIG. 3 is a schematic block diagram of an example system of a loaded vehicle including a payload and an UV or UAV, in accordance with some embodiments.

FIG. 3 is a schematic block diagram of an example system of a loaded vehicle 200 including a payload 140 and an UV or UAV 125 according to some embodiments. Payload 140 and UV or UAV 125 may be connected by one or more communication interfaces 210, 220, 230, which may also be referred to as connection interfaces herein. The one or more communication interfaces may be different interfaces. For example, each of communication interfaces 210, 220, 230 may be one of: Ethernet interface, Controller Area Network (CAN) Bus interface, serial connection interface, Inter-integrated Circuit (I²C) connection interface, printed circuit board (PCB) interface, USB connection interface, and a proprietary physical link. Communication interface 220 may be different from communication interface 210. Data packets can be transmitted bi-directionally via one or more of communication interfaces 210, 220, 230.

In some example embodiments, communication interface 210 is an Ethernet interface, and communication interface 220 is a CAN Bus interface. In some embodiments, there is a third, optional communication interface 230 which is a serial connection interface. The Ethernet interface 210 may comprise, for example, a Gigabit Ethernet physical layer.

Payload 140 may include a communication module for each of communication interface 210, 220, 230. For example, payload 140 may include an Ethernet interface communication module 240, a CAN Bus interface communication module 250 and a serial interface communication module 260. Each of the communication interface modules 240, 250, 260 may be implemented in software, hardware or a combination of software and hardware. Each module 240, 250, 260 is operable to process data packets received from the physical layer of respective communication interface 210, 220, 230 and to prepare data packets for transmission through the physical layer of respective communication interface 210, 220, 230.

A central communications module 145 on payload 140 may communicate with each of communication interface modules 240, 250, 260 to process data packets received from one or more of communication interface modules 240, 250, 260. The central communications module 145 can, upon instruction from processor 147, prepare one or more data packets for transmission through one or more of communication interface modules 240, 250, 260.

A Global Positioning System (GPS) module 149 within payload 140 is operable to communicate, through a dedicated communication interface 230, with a GPS unit or subsystem within UV or UAV 125. In some embodiments, the communication interface 230 may be a serial connection that transmits data packets. The serial connection 230 may be used to send high-speed data in one-direction from the GPS unit on UV or UAV 125 to payload 140.

In some embodiments, payload 140 may have a small micro controller functioning as a gas sensor, and may need to correlate detected sensor data with a geographical location. As payload 140 maybe a low-powered device, it may not have a GPS module on board. Instead, payload 140 may obtain GPS data from a GPS module on UV or UAV 125 through a suitable interface such as serial connection 230. This solution removes the complexities associated with integrating a GPS module within a payload, or with power consumption of a GPS module on a payload, generally lowering the cost of a payload. The serial connection 230 from UV or UAV 125 to payload 140 can be a suitable mechanism for streaming one-way data.

UV or UAV 125 may include a processor or controller 155. Processor or controller 155 transmits control commands to other components within UV or UAV 125 to control operation of the UV or UAV 125. In some embodiments, processor 155 may also transmit control commands via one or more interfaces 210, 220, 230 to payload 140 for controlling operations of payload 140.

UV or UAV 125 may include a communication module for each of communication interface 210, 220, 230. For example, UV or UAV 125 may include an Ethernet interface communication module 270, a CAN Bus interface communication module 280 and a serial interface communication module 290. Each of the communication interface modules 270, 280, 290 may be implemented in software, hardware or a combination of software and hardware. Each module 270, 280, 290 is operable to process data packets received from the physical layer of respective communication interface 210, 220, 230 and to prepare data packets for transmission through the physical layer of respective communication interface 210, 220, 230.

In some embodiments, UV or UAV 125 is controlled by a remote station, such as a ground station 160 or a client device 105. UV or UAV 125 may also be configured for autonomous control without use of ground station 160. UV or UAV 125 is configured to generate vehicle status data from sensor subsystem 150, and to transmit the vehicle status data to the client device 105 or ground station 160. The vehicle status data may be transmitted to the control station client device 105 or ground station 160 in real-time, or near real-time. The vehicle status data may include vehicle location data from sensors 150, images, videos or other types of data from payload 140, and so on. The vehicle status data may include navigation and other measurement data from navigation control 135, as well as operating parameters from processor 155 and travel (e.g., flight) control data from travel/flight control 130. The vehicle status data may include communication status data from communication module 190. The vehicle status data may also include payload status data from payload control module 185.

In some embodiments, payload 140 is controlled by a remote station, such as a ground station 160 or a client device 105. The control signals may be transmitted by the remote station to UV or UAV 125 first, which can then process and transmit control signals to payload 140.

A central communications module 190 on UV or UAV 125 may communicate with each of communication interface modules 270, 280, 290 as well as external RF interface 193 to process data packets received from the various communication interfaces. The central communications module 190 can, upon instruction from processor 155, prepare one or more data packets for transmission through one or more of communication interface modules 270, 280, 290, or external RF interface 193.

An external RF interface 193 on UV or UAV 125 may be configured to communicate with an external RF interface 173 on ground station 160. The RF interface 193 may include a radio transceiver (e.g., e.g., a radio transmitter and a radio receiver). The radio transceiver may be operable to send and receive radio signals in specific radio frequency bands, the radio signals modulated to carry one or more data packets from ground station 160 or client device 105. For example, a radio frequency band of the radio transceiver may be 2.4 G Hertz (Hz). Lower frequencies, such as 433 mega-Hertz (MHz) and 900 MHz, may be chosen for longer ranges.

In some embodiments, the frequencies chosen for an RF interface 173, 193 depend on a number of factors, which may include anticipated terrain (e.g., lower frequencies can transmit further or penetrate further into buildings or tree canopy), compliance with local regulations regarding spectrum use, possible interference with known users of spectrum, possible interference from known or anticipated sources of electromagnetic interference (EMI), ease of component availability or system manufacturability, and so on. Commonly used bands for North American civilian UVs or UAVs may be in the 2.4 giga-Hertz (GHz) uncontrolled spectrum; elsewhere, 900 MHz or other frequencies may also be employed.

In some embodiments, external RF interface 193 may include a Wi-Fi interface, such that UV or UAV 125 may communicate with ground station through Wi-Fi protocol.

Figure 4:
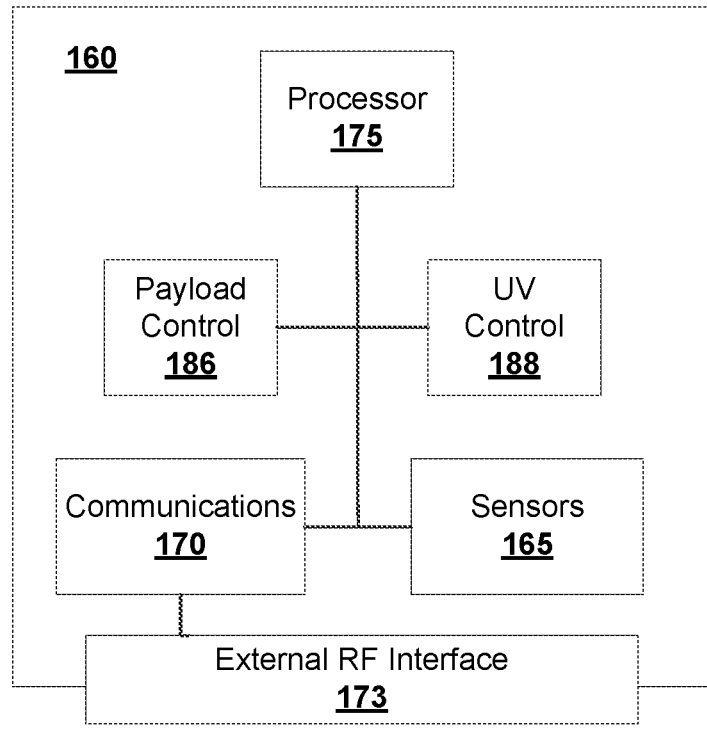
FIG. 4 is a schematic block diagram of an example ground station, in accordance with some embodiments.

Referring now to FIG. 4, which shows a schematic diagram of an example ground station 160. Ground station 160 may include a sensor subsystem 165 (which may include a global positioning system (GPS) subsystem), a communications module 170 configured to process received data packets, and to prepare data packets for transmission through external RF interface 173, an external RF interface 173 configured to communicate with external RF interface 193 on UV or UAV 125, a processor or controller 175, a payload control module 186, and a UV or UAV control module 188. The sensor subsystem 165 may be used to acquire environmental data if the ground station 160 is proximate or near the UV or UAV 125, where the environmental data may be used for controlling the UV or UAV 125, the payload 140, or the loaded vehicle 200, such as location data, weather data, and so on. Payload control module 186 may generate command signals for controlling payload 140, and UV or UAV control module 188 may general command signals for controlling UV or UAV 125. Both types of control commands may be processed by communications module 170 and transmitted to UV or UAV 125 and payload 140 via external RF interface 173.

Figure 5A:
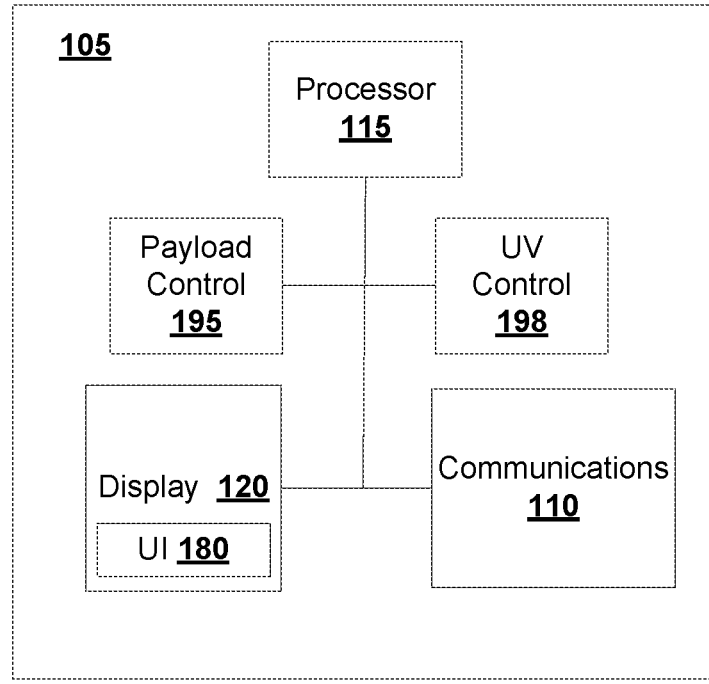
FIG. 5A is a schematic block diagram of an example client device, in accordance with some embodiments.

As shown in FIG. 5A, the client device 105 may comprise a communications subsystem 110, a processor or central computer system 115 and a display 120. The communications subsystem 110 allows for seamless communications between the client device 105 and UV or UAV 125, and seamless communications between the client device 105 and payload 140, and between the client device 105 and each ground station 160, when ground stations 160 are used. The User Interface (UI) 180 is generated by processor 115 for display on the display 120 of a client device 105, which remotely controls the UV or UAV 125, the payload 140, and/or the loaded vehicle 200 or as part of a control system for one or more vehicles. Display 120 may be a touch-screen display, but a non-touch display may be used. In some embodiments, client device 105 may be on a single-unit computer (i.e., one with a built-in display), but a multi-unit computer (i.e., with a separate display) may be used instead. Payload control module 195 may generate command signals for controlling payload 140, and UV or UAV control module 198 may general command signals for controlling UV or UAV 125. Both types of control commands may be processed by communications module 110 and transmitted to UV or UAV 125 and payload 140 via ground station 160.

The client device 105 is configured to display at least a subset of the received vehicle status data for each UV or UAV 125 or payload 140 in an interface (such as User Interface (UI) 180, for example). A display 120 may provide a graphical representation of the respective vehicle location data of each of the vehicles 125. Through the interface, the client device 105 may receive control command input. The control command input is associated with one of the UV or UAV 125 having its vehicle status data displayed in the interface. The client device 105 may then transmit the received control command, or a command derived therefrom, to the UV or UAV 125. The interface may enable a user to view status and control operation of each of one or more UV or UAVs 125 such that the location of each UAV is shown in the interface, and each UV or UAV 125 may be independently controlled through the interface by selecting a particular one of the UV or UAV 125 to control. In this way, multiple UV or UAV 125 may be monitored and controlled through an interface at the client device 105.

Further detail on the controlling UVs or UAVs 125 using interface 180 is provided in PCT Application No. PCT/CA2013/000442 entitled "System and Method for Controlling Unmanned Aerial Vehicles", the entire contents of which is hereby incorporated by reference. Client device or control station 105 may control interface panels to display a location of the UV or UAV 125.

Figure 5B:
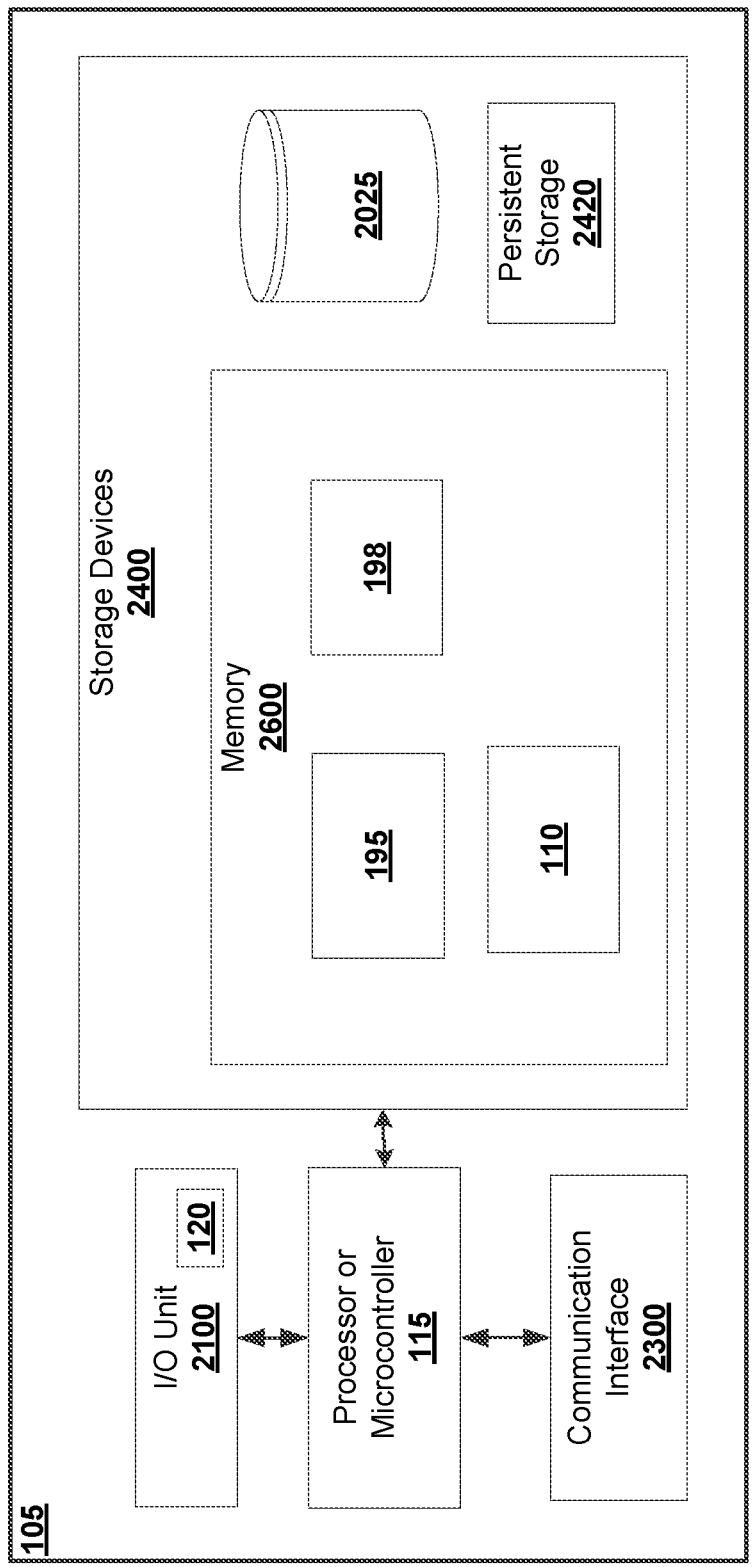
FIG. 5B is a block diagram illustrating hardware components of an example client device, in accordance with some embodiments.

FIG. 5B shows a block diagram illustrating hardware components of an example client device 105 according to some embodiments. A processor or controller 115 can execute instructions in memory 2600 to configure communications module 110, payload control module 195 and UV or UAV control module 198. A processor 115 can be, for example, any type of general-purpose microprocessor or microcontroller, a digital signal processing (DSP) processor, an integrated circuit, a field programmable gate array (FPGA), a reconfigurable processor, or any combination thereof.

Memory 2600 may include a suitable combination of any type of computer memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Storage devices 2400 include memory 2600, databases 2025, and persistent storage 2420.

Each I/O unit 2100 enables client device 105 to interconnect with one or more input devices, such as a keyboard, mouse, camera, touch screen and a microphone, or with one or more output devices such as a display screen 120 and a speaker.

Each communication interface 2300 enables client device 105 to communicate with other components, to exchange data with other components, to access and connect to network resources, to serve applications, and perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g., Wi-Fi, WiMAX), SS7 signaling network, fixed line, local area network, wide area network, and others, including any combination of these. For example communication interface 2300 may include an Ethernet connection to ground station 160, or a wireless communication interface operable to communicate with ground station 160. In some embodiments, communication interface 2300 may include a RF interface operable to communicate with UV or UAV 125.

Referring back to FIG. 3, sensors 150 on UV or UAV 125 may include different types of sensors, and may provide navigational instruments, travel instruments and flight instruments. An example sensor 150 is a magnetic sensor or magnetic field sensor, such as a magnetometer, which is used to measure the magnetization of a magnetic material, magnetic field strength, changes to the magnetic field strength, and the direction of the magnetic field at the current location of UV or UAV 125. A measurement unit may include an accelerometer and magnetometer to compute heading, elevation or bank angle of the UV or UAV 125. Other example sensors 150 include navigation instruments such as a gyroscope (e.g., device for measuring and maintaining orientation, measuring rotational velocity, and so on) and a magnetic compass. Sensors 150 may also include position instruments such as an accelerometer (e.g., device that measures proper acceleration or linear acceleration or g-force) and a GPS. The position instruments may be used to stabilize position of the UV or UAV 125 and may include instruments for angle, displacement, distance, speed, and acceleration. Sensors 150 may also include acoustic, sound and vibration instruments, transportation instruments (e.g., speedometer), chemical instruments, electrical instruments, magnetic instruments, and radio instruments, environmental, weather or moisture instruments, fluid flow instruments, radiation instruments, optical or light sensors, pressure instruments, force or density instruments, thermal instruments (e.g., thermocouple, thermometer), proximity instruments, and so on. Sonar range finders, laser range finders, and cameras are other example sensors 150. Measurement data or calibration parameters may also include rotational velocity, linear acceleration, magnetic field strength, and other data obtained or calculated from sensor subsystem 150.

UV or UAV 125 may be associated with a vehicle data set (e.g., data collected or computed for a specific UV or UAV 125) that may be updated in real-time or near-real-time. The data set for each UV or UAV 125 may be stored and updated at a remote data storage device of ground station 160 or client device 105, or a subset thereof may be stored and maintained at a local data storage device of UV or UAV 125.

The vehicle data set may be gathered by the UV or UAV 125 sensor subsystem 150 and transmitted to the ground station 160 by the UV or UAV 125 communications module 190 via RF interface 193.

UV or UAV 125 may implement different travel (e.g., flying) modes and travel (e.g., flight) plans, including manual travel (e.g., flying) mode and waypoint travel (e.g., flying) mode. A travel (e.g., flight) plan may be relative to other objects, such as another vehicle or ground station 160, or may be absolute defined by navigational data. A waypoint is a user-specified position, represented by coordinates on a map to provide a waypoint indication. It is a navigable marker, meaning that a UV or UAV 125 may be directed to go to that position. There may be attributes associated with the waypoint, such as specific actions that a UV or UAV 125 must take upon reaching the waypoint (e.g., take photos, send back photos, deliver a payload, aim a payload, trigger a payload to sample, land, move to a specific height, pause before continuing on the waypoint route, raise an alert at the control station 105, or some other set of actions), a minimum or maximum altitude which the UV or UAV 125 must not exceed while within a specified proximity to the waypoint, a maximum velocity which the UV or UAV 125 must not exceed when within a specified proximity to the waypoint, or some other attribute.

A travel (e.g., flight) plan may consist of multiple waypoint routes, with each waypoint route associated with one or more UV or UAV 125. A travel (e.g., flight) plan may consider different special areas, including a no-fly zone, points of interest, targets, perimeters, and so on.

A no-fly (or no entry) zone is conceptually a boundary though which a UV or UAV 125 may not pass, such that a UV or UAV 125 may not be located within the no-fly (or no entry) zone. A no-fly (or no entry) zone may be a closed boundary, ordered series of points, and the lines connecting these points, a regular shape, such as a circle or oval, with specified defining characteristics (e.g., for a circle, center point and radius).

A point of interest ("POI") is a navigable marker (that is, a marker to which the vehicle may be navigated), unless it is located within a no-fly (or no entry) zone. A POI may also be used as a target for camera viewing (e.g., for payload 140), sensor readings, or as an objective point for another on-vehicle payload.

A target is a non-navigable marker (that is, a marker to which a vehicle may not be navigated). A target is often used to indicate an objective point for camera viewing (e.g., for payload 140), sensor readings, or some other on-vehicle payload. A target may be contained within a no-fly (or no entry) zone.

A perimeter is conceptually a shape through whose boundary a vehicle may not pass, such that a vehicle must be located within the perimeter. A perimeter may be a closed shape, ordered series of points, and the lines connecting these points, or a regular shape, such as a circle or oval, with specified defining characteristics (e.g., for a circle, center point and radius).

In order for UV or UAV 125 to implement different travel (e.g., flying) modes and travel (e.g., flight) plans accurately, sensors 150 (e.g., magnetic sensors) and other navigation instruments and travel (e.g., flight) instruments with magnetized or magnetic components should be properly calibrated to ensure proper operation of the UV or UAV 125.

A payload 140 is often used to deliver parcels, record photographs or videos from the perspective of the UV (e.g., an aerial perspective of a UAV), or to capture and transmit environmental data in regions that are difficult or dangerous to access by human. In almost all the scenarios, it is desirable for a remote station, such as a ground station 160 or a client device 105 to communicate with, and often control, the payload 140 as well as the UV or UAV 125 remotely. A user may be associated with the ground station 160 or client device 105. For example, a user may monitor a flight, navigation or movement path of the UV or UAV, which may also be a travel (e.g., flight) path of the payload, and receive, in real-time or near real-time, one or more photographs from the payload (e.g., a camera) taken along the travel (e.g, flight) path. The user may wish to explore an area identified in the photograph in greater detail, and may thus send command signals to the payload 140 to zoom in a particular direction, as well as send command signals to the UV or UAV 125 to travel or fly a bit closer to the area, or stay stationary while the payload zooms in and takes additional photographs.

Figure 8:
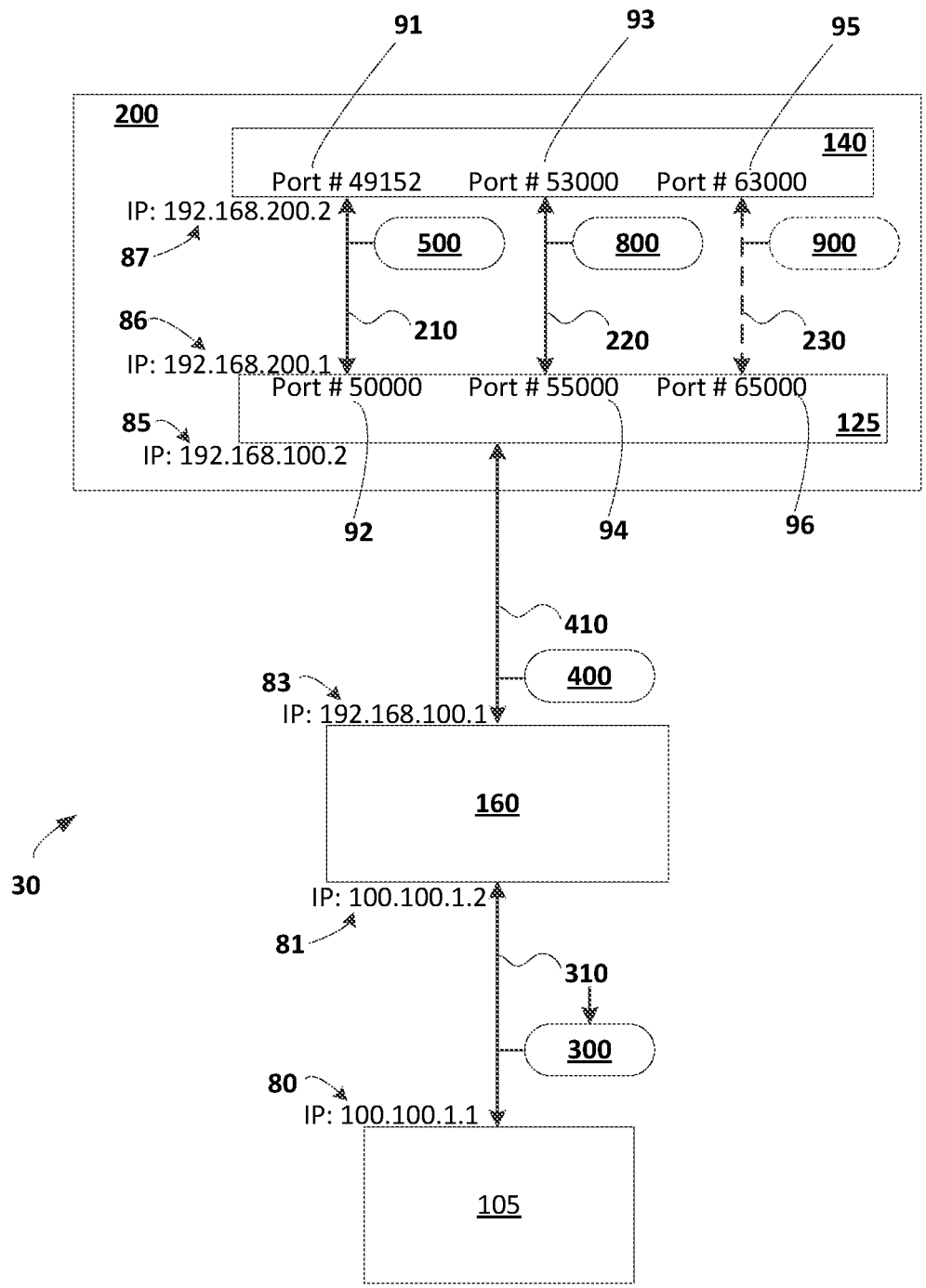
FIG. 8 is a schematic block diagram of an example system of an UV or UAV in communication with a ground station and a client device with IP addresses, in accordance with some embodiments.

Referring now to FIG. 8, which illustrates a communication system 30 including a client device 105, a ground station 160, and a loaded vehicle 200. In some embodiments, a client device 105 is configured to receive and transmit electronic signals representative of one or more data packets 300 from/ to a ground station 160. A ground station 160 is configured to receive and transmit electronic signals representative of one or more data packets 400 from/ to UV or UAV 125. A UV or UAV 125 is configured to receive and transmit electronic signals representative of one or more data packets 500, 800, 900 from/ to payload 140. Even though only one client device is illustrated, there can be multiple client devices. Similarly, there can be multiple ground stations and multiple UVs or UAVs and payloads.

Client device 105 and ground station 160 may be connected through a suitable communication network or interface 310. For example, client device 105 and ground station 160 may be a wired connection or connected wirelessly. For example, client device 105 and ground station 160 may be connected wirelessly via wireless local area network (WLAN) 310. In some embodiments, within the communication network 310, client device 105 may be associated with an Internet protocol (IP) address 80, for instance, 100.100.1.1. Ground station 160 may be associated with an IP address 81, for instance, 100.100.1.2. IP addresses 80, 81 may be assigned statically or allocated by a Dynamic Host Configuration Protocol (DHCP) system. Of the four octets of the 32-bit IP addresses 80, 81, the first three are identical. That is, based on the IP addresses, it can be determined that the two devices 105, 160 are likely on the same subnet. Data packets 300 may be transmitted bi-directionally via communication network 310.

Ground station 160 and UV or UAV 125 may be connected through a suitable wireless communication network or interface. For example, ground station 160 and UV or UAV 125 may be connected through a radio-based network 410, e.g., a radio frequency communication channel. Range, signal strength, type of antenna, and additional attributes of the radio system may vary. In some embodiments, ground station 160 may be associated with an IP address 83, for instance, 192.168.100.1. UV or UAV 125 may be associated with an IP address 85, for instance, 192.168.100.2. The IP addresses 83, 85 may be statically or dynamically assigned within the radio network 410. Data packets 400 may be transmitted bi-directionally via radio network 410.

Payload 140 and UV or UAV 125 may be connected through one or more suitable communication networks or interfaces. For example, as described herein, payload 140 and UV or UAV 125 may be connected through an Ethernet interface 210, a CanBus interface 220, and optionally a serial connection 230. In some embodiments, UV or UAV 125 may be associated with an IP address 86, for instance, 192.168.200.2. Payload 140 may be associated with an IP address 87, for instance, 192.168.200.2. IP addresses 86, 87 may be assigned statically or allocated by a Dynamic Host Configuration Protocol (DHCP) system. Of the four octets of the 32-bit IP addresses 86, 87, the first three are identical. That is, based on the IP addresses, it can be determined that the two devices 125, 140 are likely on the same subnet.

Ethernet interface 210 may be configured to transmit, in a single direction or bi-directionally, data packets 500 that require relatively high-speed transmission. For example, Ethernet interface 210 may be configured to transmit high-quality image or video data from payload 140 to ground station 160 or client device 105. In some embodiments, the data packets 500 may tolerate some loss during transmission from ground station 160 to payload 140. For instance, an image (e.g., a Joint Photographic Experts Group (JPEG) file) stored on payload 140 may be approximately 1 megabytes (MB) in size, which is transmitted in approximately, for example, 2000 data packets 500. Out of the 2000 data packets, 5% or 100 data packets may be lost or corrupted during transmission, and the imagine can still be reconstructed by ground station 160 or client device 105 using the rest of data packets 500, without affecting the overall quality of the reconstructed image. In some embodiments, Ethernet interface 210 may be used to transmit non-critical data that can tolerate minimal or some data loss during transmission.

In some embodiments, a payload development kit ("PDK") may be provided. The PDK may include a software package that allows third party users to develop and deploy applications that can extend the aircraft functionality of UV or UAV 125 to a graphical user interface (GUI) on ground station 160 or client device 105 (or both), and in turn allow the ground station 160 or client device 105 to control certain subsystems (e.g., flight, camera, navigational flight plans) of UV or UAV 125 and/or payload 140. To this end, the third party user, through the ground station 160 or client device 105, would need to receive various state data about UV or UAV 125 and/or payload 140. The state data may be produced by subsystems on the UV or UAV and the payload, and available to ground station or client device for consumption and use, through the PDK interface, as if the ground station or client device is communicating directly with the payload 140. For example, payload 140 can communicate to the UV or UAV 125 over the Ethernet interface 210, and the UV or UAV 125 can route the communication to ground station 160 in real time or near real time.

CanBus interface 220 may be configured to transmit data packets 800 that require lossless, or nearly lossless transmission, such as command signals. CanBus interface 220 may in some embodiments transmit data packets at a slower speed than Ethernet interface 210 does; at the same time, CanBus interface 220 can be a more reliable communication link than an Ethernet connection, and as a result, can be more suitable for delivery of critical data packets such as various command signals. For example, CanBus interface 220 may be used to transmit one or more command signals such as: travel (e.g., flight) control commands (e.g., requested heading, altitude, orientation, all motors off), navigation commands (e.g., travel (e.g., fly) home, stop and hover), communications link commands (e.g., change encryption parameters, change radio channel), camera commands (e.g., change camera heading, zoom in or out, enable/disable video, take still image) or other commands (e.g., turn lights on/off). The data packets 800 may be transmitted in a single direction, or bi-directionally. In some embodiments, the transmission rate of a CanBus interface 220 may range from 40 kilobits (Kbits) to 1 Mbits per second.

In some embodiments, data packets designated for CanBus interface 220 may be encapsulated within a HyperText Transfer Protocl (HTTP) request by client device 105. One or more client devices 105 can send CanBus requests encapsulated within one or more HTTP requests to payload 140 through the UV or UAV 125. These requests travel over the radio network 410 to UV or UAV 125, and are then de-encapsulated and transmitted through CanBus interface 220 to payload 140. In some embodiments, payload 140 may also update variables on the UV or UAV 125, and the updated variables may be read by the ground station 160 or client device 105 through the same HTTP interface. As further described below in reference to FIGS. 6 and 7, the HTTP requests may include one or more data frames, each data frame including a data packet.

A third communication interface 230 (which is optional) may be a serial connection interface 230 configured to transmit data packets 900, in a single direction, or bi-directionally. For instance, serial connection 230 may be used to transmit data packets 900 from a GPS system on UV or UAV 125 to payload 140, to help facilitate zooming in/out or capturing data by payload 140.

In some embodiments, CanBus interface 220 may be used by payload 140 to inform the GPS system on UV or UAV 125 types of data the payload requires, and the GPS system may transmit the requested data to the payload over the serial connection 230. The GPS system may only need to be told once what data to send, and send the requested data continuously or whenever an updated is available. This requested data may include location information, altitude, precise time, and other types of data. The use of a serial connection 230 between the GPS system on UV or UAV 125 and payload 140 means that the UV or UAV does not need to separately retrieve, process and route the data from the GPS system to payload.

In some embodiments, the CanBus 220 and/or the serial connection 230 may provide other data from UV or UAV 125 to payload 140, such as attitude/heading (useful for pointing cameras), battery state, distance and direction to the ground station (useful for command relay), and mission objectives.

On UV or UAV 125, each of the communication interfaces 210, 220, 230 may be assigned a sub-address defined within the Internet Protocol, such as a port number 92, 94, 96. On payload 140, each of the communication interfaces 210, 220, 230 may be assigned a port number 91, 93, 95. Based on the port number, a data packet 400 arriving at UV or UAV 125 may be processed and re-routed to payload 140 via one of the communication interfaces 210, 220, 230. Similarly, based on the port number, a data packet at payload 140 may be transmitted to UV or UAV 125 via one of the communication interfaces 210, 220, 230. The port numbers may be statically or dynamically assigned.

Any of the communication channels or links 310, 410, 210, 220, 230 may be encrypted for secure communication. For example, HTTPS technology may be used to facilitate transmission of data on communication link 310. For another example, certain signal modulation may be applied to transmission of data using radio communication link 410. Other encryption methods may be used as well, such as public/private key scheme, secure hash algorithms such as SHA56 encryption algorithm, and verification of a message authentication code or a digital signature.

At an initial set-up or configuration stage, which in some embodiments may be automatically executed as soon as the payload 140 is physically connected to UV or UAV 125, IP addresses and appropriate port numbers may be assigned for each communication interface between payload 140 and UV or UAV 125. The communication interfaces 210, 220, 230 may share the same IP address on each system (e.g., payload 140 or UV or UAV 125), or be assigned different IP addresses. Port numbers for communication interfaces 210, 220, 230 are different on each system. The port numbers may be randomly assigned within a certain range. For example, the port numbers 91 to 96 may be selected from a range between 49152-65535, which are known to be dynamic or private ports within TCP/IP. In some embodiments, a user may manually configure or customize the initial set-up or configuration of the port number or IP address of payload 140 or UV or UAV 125.

During the initial set-up or configuration stage, payload 140 and UV or UAV 125 may automatically negotiate a set of interfacing rules, including, without limitation, at least one of:

which communication interface(s) are available for use;
which protocol(s) to use on each communication interface;
the network address of the payload;
the network (IP) ports on which the payload will send or receive data;
a power-consumption profile for the payload;
any other UV or UAV configuration parameters that the payload needs for its operation;
any other payload configuration parameters that the UV or UAV or ground control system needs for operating the payload or the loaded vehicle.

Figure 7:
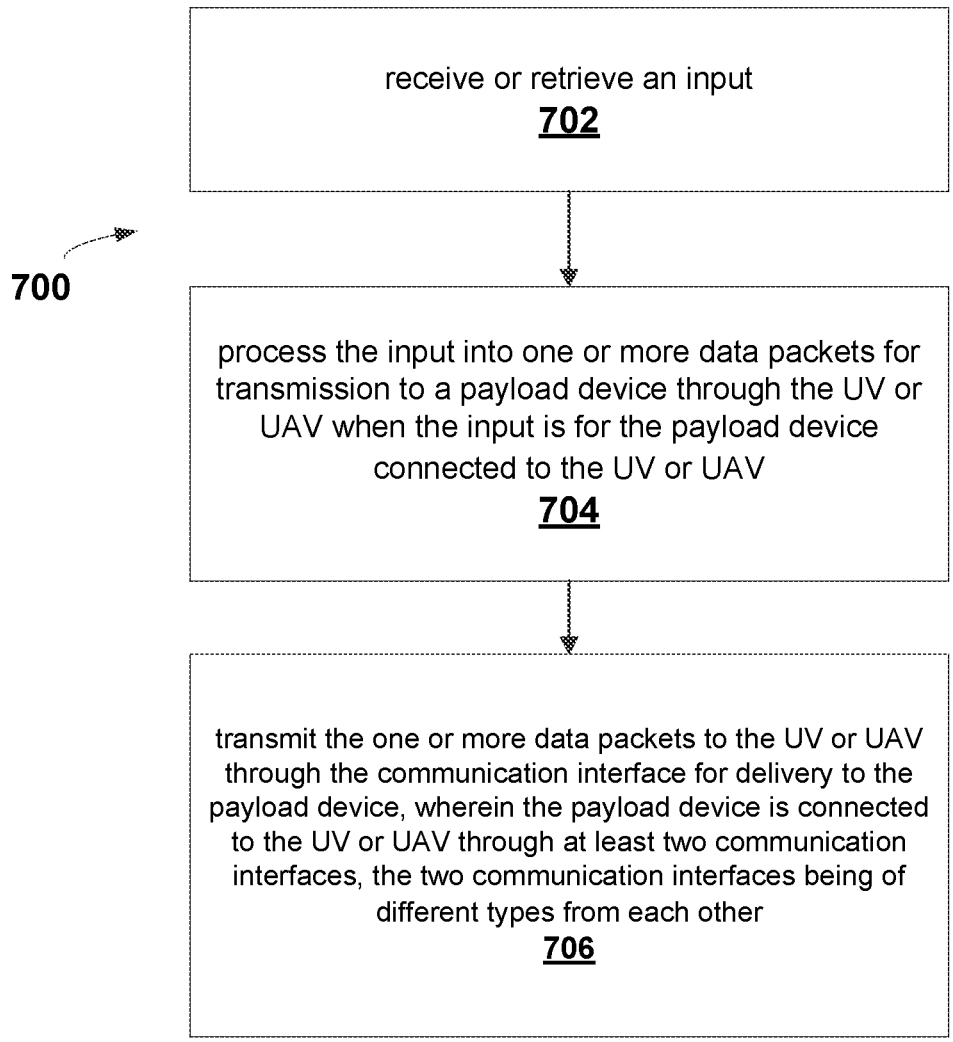
FIG. 7 is a flow chart illustrating an example process of processing input, by a remote station, for transmission to a payload device, in accordance with some embodiments.

FIG. 7 is a flow chart illustrating an example process 700 of processing input, by a remote station, for transmission to a payload device 140, according to some embodiments. The remote station (e.g., ground station 160) may include a processor 155, a communication interface 193 for communicating with one or more UV or UAVs 125; and a non-transitory memory device storing a communications module 190, the communications module comprising machine-readable instructions that, when executed by the processor, causes the processor to receive or retrieve an input at step 702. The input may be received from an input/output (I/O) interface on remote station 160, for example as an user input. The input may also be received from a client device 105 through connection interface 310, such as data packets 300. In some embodiments, the input may be retrieved from a memory device or from a cloud network. In some embodiments, the input may be determined by an intelligent, non-human agent such as an artificial intelligence agent using machine learning technologies.

In some embodiments, the remote station may be the client device 105, with or without a ground station 160. That is, the process described herein with reference to FIG. 7 may be executed by a ground station 160 or a client device 105, or both (e.g., steps 702 and 704 may be performed by client device 105, and step 706 may be performed by ground station 160).

At step 704, remote station 160 can process the input into one or more data packets 400 for transmission to a payload device through the UV or UAV when the input is for the payload device 140 connected to the UV or UAV 125.

Figure 9:
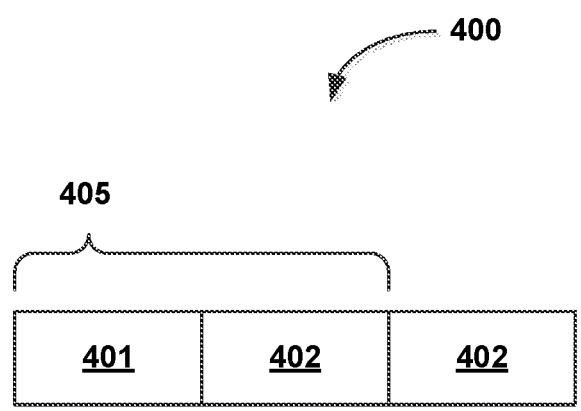
FIG. 9 shows an example data packet prepared by a remote station for transmission to a payload connected to a UV or UAV, in accordance with some embodiments.

In some embodiments, the input can be processed into one or more data packets 400 by encapsulating some or all of the input within the one or more data packet 400. Each data packet 400 may include a (data) payload and a header. For example, data packets 400 may be assembled or constructed based on a known protocol, such as an Transmission Control Protocol/Internet Protocol (TCP/IP) protocol. FIG. 9 shows an example data packet 400 including: a header portion 405 and a payload or message portion 403. The header portion 405 may include an IP address field 401 and a port number field 402. The IP address field 401 may include a destination IP address and optionally a source IP address. The destination IP address may be, for example, the IP address of UV or UAV 125 if the data packet 400 is sent from remote station to UV or UAV 125. In some embodiment, the destination IP address may be the IP address of payload 140, for example, in cases where data packets are sent directly to the payload 140, bypassing UV or UAV 125. The port number field 402 may include a destination port number and optionally a source port number. There may be one or more additional fields (not illustrated) such as MAC address, Ethernet header, protocol type, message type (e.g., control command or otherwise), checksum. Even though IP protocol is used as an example, other appropriate communication standards or protocol may be used.

Referring back to FIG. 7, at step 706, remote station 160 can transmit the one or more data packets 400 to the UV or UAV 125 through the communication interface 193 for delivery to the payload device 140, where the payload 140 is connected to the UV or UAV 125 through at least two communication interfaces 210, 220, the two communication interfaces being of different types from each other.

Remote station may process the input for transmission into data packets 400 based on a type of the input. For example, if the input is a control command for the payload 140, the remote station may process the input into data packet for transmission to the payload device through communication interface 210; and if the input is determined to be data other than control commands (e.g., general status request) for the payload 140, the remote station may process the input into data packet for transmission to the payload through communication interface 220.

An example input that is not control command can be a travel (e.g., flight) plan. For example, depending on the functionality of payload 140, a travel (e.g., flight) plan may need to be uploaded to the payload 140 before or during travel (e.g., flight). The travel (e.g., flight) plan maybe referenced by payload 140 during flight execution and if appropriate, modified by payload 140 autonomously. In this case, the remote station may process the travel (e.g., flight) plan into data packet for transmission to the payload through communication interface 220, since travel (e.g., flight) plan is not considered to be a control command.

Figure 6:
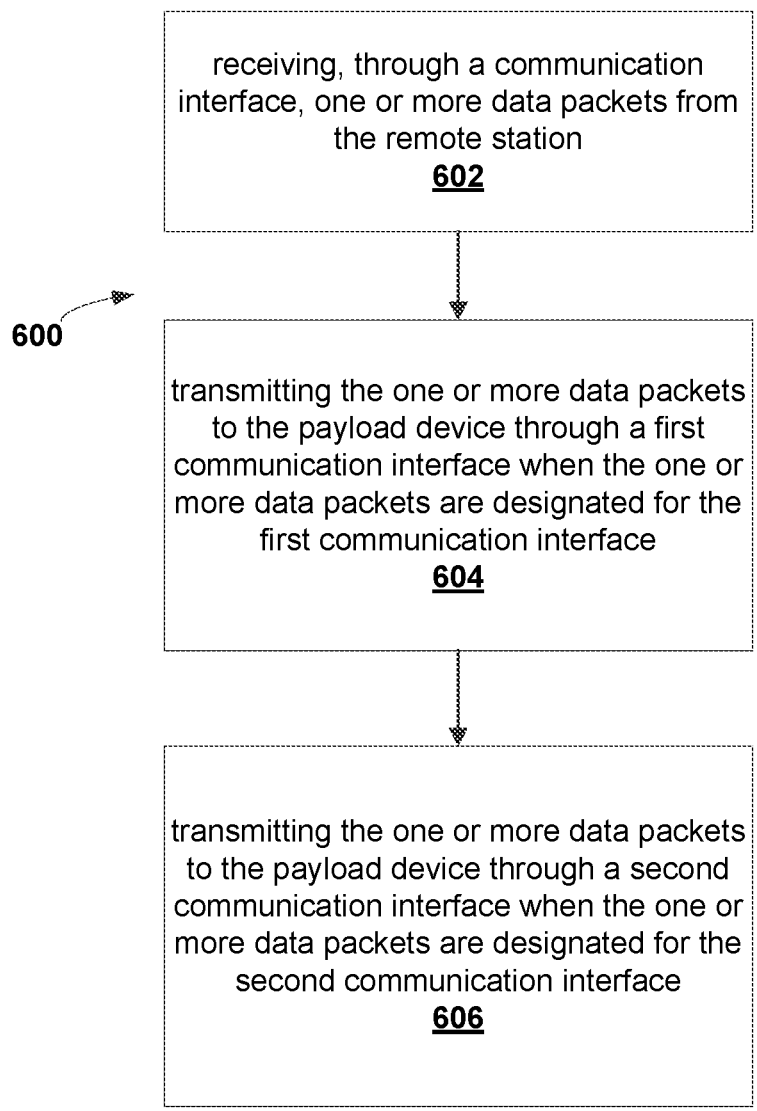
FIG. 6 is a flow chart illustrating an example process of communicating with a payload through an UV or UAV, in accordance with some embodiments.

FIG. 6 is a flow chart illustrating an example process 600 of communicating with a payload 140 through an UV or UAV 125 according to some embodiments. UV or UAV 125 may include a first and a second communication interface 210, 220 for connecting to and/or communicating with a payload 140, and a third communication interface 193 for communicating with a remote station via radio network 410, the first and second communication interfaces being of different types from each other.

At step 602, UV or UAV 125 may receive, through the third communication interface 193, one or more data packets 400 from the remote station 160 or 105.

At step 604, UV or UAV 125 may transmit the one or more data packets to the payload 140 through the first communication interface 210 when the one or more data packets 400 are designated for the first communication interface.

At step 606, UV or UAV 125 may transmitting the one or more data packets to the payload 140 through the second communication interface 220 when the one or more data packets 400 are designated for the second communication interface.

In some embodiments, UV or UAV 125 may determine that one of the one or more data packets is designated for the first 210 or second communication interface 220 based on a header 405 of the one data packet 400.

In some embodiments, UV or UAV 125 may determine that one of the one or more data packets is designated for the first 210 or second communication interface 220 based on an IP address 401 of the one data packet 400.

In some embodiments, the first and second communication interfaces comprise logical interfaces implemented through at least one hardware interface.

In some example embodiments, a data packet 400 prepared or assembled by remote station may include information representing if the data packet is designated for payload 140. For example, data packet 400 may, in addition to carrying the data payload in a data field 403, include information representing an IP address of payload 140 in an IP address field 401 as part of a header 405. For another example, data packet may include information representing an IP address of UV or UAV 125 in an IP address field 401 as part of a header 405, and include additional information in header 405 indicating that the data packet is designated for payload 140 connected to UV or UAV 125, so that UV or UAV 125 may process and transmit the data packet to payload 140 upon receipt of data packet 400. For example, data packet 400 may include, in a port number field 402 as part of a header 405, information representing a port number corresponding to a port number 91, 93, 95 assigned to a communication interface 210, 220, 230. That is, a data packet 400 prepared by remote station 160, 105 for transmission to UV or UAV 125 or payload 140 can include, in a header portion 405, information representative of the destination (e.g., UV or UAV 125 or payload 140) and a communication interface (e.g., 210) selected for routing the data packet to the destination. Where there is only one communication interface, the port number field 402 may be set to a default number or left empty.

Remote station may select an appropriate communication interface for routing data packet 400 based on a type of the input received and used to prepare the data packet. For an input that contains an image, if communication interface 210 is faster and more appropriate for transmitting high-quality data, remote station may select communication interface 210 for transmitting data packet 400 to payload 140, and prepare the data packet accordingly, so that once UV or UAV 125 has received the data packet, it may process and route the data packet through interface 210 to payload 140. For an input that contains a control command, if communication interface 220 is more reliable and more appropriate for transmitting critical data such as control commands, remote station may select communication interface 220 for transmitting data packet 400 to payload 140, and prepare the data packet accordingly, so that once UV or UAV 125 has received the data packet, it may process and route the data packet through interface 220 to payload 140.

In some embodiments, a port number in data packet 400 may represent both a destination (e.g., payload 140) and a communication interface (e.g., interface 210). For example, data packet 400 may include a destination IP address for UV or UAV 125, which is the system connected to remote station via radio network 410. In this instance, data packet 400 will be sent to UV or UAV 125 first before reaching payload 140. The data packet may further include a port number 91 corresponding to communication interface 210, which indicates to UV or UAV 125 that the data payload 403 carried in data packet 400 is intended for payload 140 and should be transmitted to the payload via communication interface 210.

If data packet 400 includes, in port number field 402, one from a plurality of port numbers 91 to 96, UV or UAV 125 may process and interpret the specific port number to determine a final destination for the data packet. If the port number is, for example, 50000 corresponding to an interface on UV or UAV 125, then the communication module on UV or UAV 125 can determine that data packet 400 is intended for itself, instead of payload 140.

UV or UAV 125 may store, on local memory, a reference table mapping each port number to a corresponding destination device and/or a corresponding communication interface.

In some embodiments, UV or UAV 125 may determine that data packet 400 is designated for the first 210 or second communication interface 220 based on a subnet of the destination IP address of the data packet. For example, if IP address 85 of UV or UAV 125 is 192.168.200.1 and IP address 87 of payload 140 is 192.168.200.2, and the destination IP address contained in an IP address field 401 in the header portion 405 is 192.168.200.1/26, the presence of "/26" may be mapped to one of communication interfaces 210, 220, 230 of payload 140. That is, when UV or UAV 125 receives data packet 400, it can parse the data packet and read the information contained within the header, and based on "/26" within the destination IP address, determine that the data packet is meant or designated for payload 140 via communication interface 210. When the destination IP address contained in an IP address field 401 in the header portion 405 is 192.168.200.1/27, UV or UAV 125 can parse the data packet and read the information contained within the header, and based on "/27" within the destination IP address, determine that the data packet is meant or designated for payload 140 via communication interface 220. When the destination IP address contained in an IP address field 401 in the header portion 405 is 192.168.200.1/28, UV or UAV 125 can parse the data packet and read the information contained within the header, and based on "/28" within the destination IP address, determine that the data packet is meant or designated for payload 140 via communication interface 230. Even though example IP addresses described herein are in IPv4 format, IPv6 may also be used in place of IPv4.

In some embodiments, the payload addressing may be static as the network packets are forwarded depending on configured ports from externally facing Wi-Fi interface on the UV or UAV to the payload's static IP address corresponding to a specific port.

In some embodiments, a NAT (Network Address Translation) system may be used to map the payload 140 directly into the subnet of the client device(s) 105. That is, to a client device 105, the payload 140 may appear to be on its local network, so IP packets can be sent and received by the client devices 105 to/from payload 140 as if they were on the same network.

In some embodiments, ground station 160, client device 105, and UV or UAV 125 are all on the same network. When payload 140 attaches to UV or UAV 125, the payload may be configured to connect to the UV or UAV on one or more connection interfaces (e.g., Ethernet 210 or CanBus 220). For example, as described herein, one or more specific ports can be configured to forward packets from the UV or UAV's external interface (e.g., a radio or Wi-Fi interface) to the Ethernet interface 210 that the payload is connect to. An IP address may be dedicated to the payload on the Ethernet interface 210. From ground station's perspective, UV or UAV 125 may act as the point of contact for payload 140. Ground station 160 or client device 105 therefore does not address the payload directly when transmitting data. For example, upon connecting to UV or UAV 125, payload 140 may request for port 4001 to be opened for forwarding between the UAV's external interface 193 and the Ethernet interface 210. An IP address for payload 140 may be assigned for port 4001. The routing rules can then be automatically configured on UV or UAV 125, which causes all packets for port 4001 to be forwarded to the payload's corresponding IP address on port 4001. The ground station may then attempt to send data packets to payload 140 by sending the data packets to port 4001 on the UV or UAV's IP address assigned to the UV or UAV's external interface 193, which may be radio or Wi-Fi.

In some embodiments, UV or UAV 125 may be configured to monitor a quality of service (QoS) score of a first communication channel associated with the first second communication interface 210, and upon detecting that the QoS score is below a pre-determined threshold, UAV 125 may be transmit the one or more data packets to the payload device through the second communication interface 220 when the one or more data packets are designated for the first communication interface 210. Similarly, UV or UAV 125 may be configured to monitor a quality of service (QoS) score of a second communication channel associated with the second communication interface 220, and upon detecting that the QoS score is below a pre-determined threshold, UV or UAV 125 may transmit the one or more data packets to the payload device through the first communication interface 210 when the one or more data packets are designated for the second communication interface 220.

The QoS score may indicate, in some cases, that the associated communication channel may have a network or connection failure (e.g., QoS score being much lower than the pre-determined threshold), or may be close to a network or connection failure (e.g., QoS score being below but close to the pre-determined threshold). In these scenarios, UV or UAV 125 may pre-emptively, or concurrently with detection of the network failure, route all traffic to payload 140 through the communication channel that is not detected to have any network or connection issues. For instance, if communication interface 210 somehow fails, data packets meant for payload may be transmitted via communication interface 220 or 230, even if the data packets are previously determined to be designated for communication interface 210.

In some embodiments, a traffic management mechanism may be applied to one or more of communication links 310, 410. For example, a QoS system may be used to prioritize control command signaling over other uses (e.g., payload data transmission that does not include any control command). Each type of data may be categorized based on priority and transmitted according to a pre-determined QoS protocol.

Both the pre-determined QoS threshold for detecting network issues and the QoS protocol for traffic management may be initialized automatically, or manually set by a user, at the initialization stage of payload 140 or UV or UAV 125.

In some embodiments, UV or UAV 125 may transmit data packets from the payload 140 to the remote station through the third communication interface 193 via radio network 410.

Authentication

In some embodiments, one or more of payload 140, UV or UAV 125, client device 105 and ground station 160 may receive and authenticate an identity associated with a sender of the data packets 300, 400 prior to transmitting any data packet to UV or UAV 125 or payload 140. For example, the sender of an input which contains a control command for UV or UAV 125 or payload 140 may be client device 105. Client device 105 may first authenticate a user (e.g., a human logged into the communication system via user interface 180) as being someone who has a role or rank that has been pre-approved to access and control UV or UAV 125 and/or payload 140.

In some embodiments, the client devices 105 may need to present credentials or permission to use from another (e.g., secondary) source, which the payload, UV or UAV or ground station may verify individually. Such credentials may be operator credentials, chain of command authorization for specific actions, and so on. For example, a certain payload may only be accessible for use to a pilot of a certain rank (or higher) who has not logged more than a certain amount of travel (e.g., flight) time in the last 24 hours, and some functions on the payload may then only be accessible if authorized by a second person with a specific rank. Such authorization requirements, on a function-by-function or port-by-port basis, may be set up by payload 140 or UV or UAV 125 at the time of initial configuration, and subsequently communicated to the ground station and/or client device.

In some embodiments, client device 105 itself may need to be authenticated by ground station 160, UV or UAV 125 or payload 140 prior to sending any data packets 300 to ground station or payload. This may be accomplished through a private key system, a public key system, or any other authentication system. Such a system may be pre-built into the communication system on the ground station or the UV or UAV, so that client devices do not need their own authentication system.

In some embodiments, UV or UAV 125 may be required to authenticate itself to the payload 140. For example, only a UV or UAV in a specific fleet may connect to and use a specific payload. This may be accomplished by one or more appropriate authentication mechanism(s) at the stage of initial configuration of the payload. If the UV or UAV cannot be authenticated, some or all features on the payload may be disabled, or the payload may operate in a different manner (e.g., degraded as opposed to fully functional).

In some embodiments, payload 140 may be required to authenticate itself to UV or UAV 125. For example, to only allow payloads which have gone through some certification process to be used with a particular UV or UAV. Various authentication methods may apply.

The software components of various devices 105, 160, 125, 140 relating to the communication protocol, scheme and interfaces in the embodiments described herein may be implemented as part of Payload Development Kit (PDK).

The PDK is a software development kit which enables simple and rapid third-party integrations and payload developments. For example, the PDK allows all or a substantial amount of software development required for a payload to communicate seamlessly with the ground station or client device to be on the ground station, which communicates with the UV or UAV through a network. The PDK interface provides power and secure communication (e.g., encrypted communication channel) to the payload over TCP/IP, and from the ground station software developer's perspective, any data transmitted from and to the payload may be through the TCP/IP interface of the PDK, regardless of how the data actually travels to the payload. In addition, there is no need to develop software for the UV or UAV, as the payload communicates with a transparent interface directly to the software developed through the PDK on the ground station.

In some embodiments, the PDK may provide a flexible hardware, software and electrical interface for end-users and systems integrators to quickly develop tightly integrated payloads for a UV or UAV. In addition, a Software Development Kit (SDK) may be provided to interface with other control applications across a set of secure APIs.

In some embodiments, a payload development kit ("PDK") may be provided. The PDK may include a software package that allows third party users to develop and deploy applications that can extend the aircraft functionality of UV or UAV 125 to a graphical user interface (GUI) on ground station 160 or client device 105 (or both), and in turn allow the ground station 160 or client device 105 to control certain subsystems (e.g., travel (e.g., flight), camera, navigational flight plans) of UV or UAV 125 and/or payload 140. To this end, the third party user, through the ground station 160 or client device 105, would need to receive various state data about UV or UAV 125 and/or payload 140. The state data may be produced by subsystems on the UV or UAV and the payload, and available to ground station or client device for consumption and use, through the PDK interface, as if the ground station or client device is communicating directly with the payload 140. For example, payload 140 can communicate to the UV or UAV 125 over the Ethernet interface 210, and the UV or UAV 125 can route the communication to ground station 160 in real time or near real time.

For instance, a user may wish to control a payload 140 that contains a gimbal (e.g., a pivoted support that allows the rotation of an object about an axis) when the payload 140 is in the air and connected to a UV or UAV 125. In order to do so, the user can develop software for a remote station (e.g., a ground station or a client device) using the PDK. The PDK may allow the user to develop and deploy a software application which can communicate with the payload 140 through the UV or UAV 125 over the wireless link. Data packets may be sent and received by the remote station to/from the payload through the UV or UAV 125. Once the data packets are received by the UV or UAV 125, it will forward the packets through one or more appropriate interfaces 210, 220 to the payload. The payload 140 may need to be kept up-to-date of information regarding the orientation and environment around it to perform its functionality more accurately. As such the payload 140 will require state data from UV or UAV 125 at a steady interval. This data may include data representing: GPS coordinates, aircraft heading, bearing or height above sea level, and so on. Together, with remote station 160 or 105 controlling the payload 140 and the UV or UAV 125 providing the means to communicate remotely as well as providing important state data to payload 140, the payload can perform its functions as required by the user.

In some embodiments, the SDK may be stored on a non-transitory computer readable medium for developing software applications for controlling UV or UAV 125 and payload 140. The SDK may include one or more application programming interfaces (APIs) for utilized in developing software applications at a remote station (e.g., ground station 160 or client device 105). For example, in some embodiments, a first API can be configured to access the UV or UAV to obtain information regarding the payload; and a second API can be configured to access the payload to obtain information regarding the UV or UAV.

In some embodiments, the first API is configured to access the payload through a communication interface 210 or 220 between the remote station and the UAV.

In some embodiments, the second API can receive, at the remote station, one or more data packets designated for the payload device, transmit the one or more data packets to the payload device through the first communication interface when the one or more data packets are designated for the first communication interface, and transmit the one or more data packets to the payload device through the second communication interface when the one or more data packets are designated for the second communication interface.

Secondary Device on Payload or UV or UAV

In some embodiments, client software may be installed at a client device 105 to facilitate communication with a secondary device connected to the payload 140 or UV or UAV 125. The connection interface between the secondary device and the payload or the UV or UAV may be a serial, USB or network connection. A virtual driver subsystem, which may be packaged as part of the PDK, may be configured to enable the connection between the client device and the secondary device.

For example, if the secondary device is a USB device, a virtual device driver (for instance, a virtual USB driver on the client device which may have a WindowsTM operating system (OS)) may process and package the data packets between the client device and the USB device, and encapsulate the data packets between the USB device and the client device for transmission on one or more of the available communication channels associated with connection interfaces from client device to the UV or UAV (which may include a ground station in-between), and from the UV or UAV to the payload. The UV or UAV or payload may contain a USB interface, to which the USB device may connect, as well as connection and processing circuitry to allow the USB signals to be de-encapsulated from the network communication channels 310, 410, 210, 220, 230 and transmitted directly via the USB interface to the USB device. Data flowing in the other direction would be similarly encapsulated by communication modules on the payload and the UV or UAV, transmitted to the client device, and de-encapsulated by the virtual driver on the client device, and relayed to the appropriate application on the client device.

In some embodiments, the secondary device may be connected directly to the UV or UAV via an appropriate connection interface (e.g., a USB interface), in which case the communication module on the UV or UAV may handle the encapsulation and de-encapsulation of the data packets between the client devices and the secondary device.

Control by Payload

In some embodiments, a payload 140 may issue or route one or more commands to UV or UAV 125, through a communication interface such as CanBus 220. This allows the payload to control the UV or UAV, which may be needed if the radio communication channel 410 between the UV or UAV and remote station fails or experiences issues. This may be referred to as "control by payload (CBP)". CBP may be configured automatically at system or payload start-up stage, along with the other configuration parameters. A specific set of commands may be available to payload 140 for use. Examples of commands available include travel (e.g., flight) control commands (e.g., requested heading, altitude, orientation, all motors off), navigation commands (e.g., travel (e.g., fly) home, stop and hover), communications link commands (e.g., change encryption parameters, change radio channel), camera commands (e.g., change camera heading, zoom in or out, enable/disable video, take still image) or other commands (e.g., turn lights on/off).

In some embodiments, payload 140 may contain an out-of-band wireless signaling system (such as a remote control system). In the event that the main radio communication link 410 between UV or UAV 125 and remote station is lost or otherwise unfit for data transmission, the direct wireless link between payload 140 and UV or UAV 125 can take over, or can provide emergency commands to the UV or UAV.

In some embodiments, a wireless link between payload 140 and UV or UAV 125 may be provided.

In some embodiments, a separate wireless communications channel or system may be used by the payload to communicate with a remote station. Such a system may use a different spectrum or even a different physical mechanism entirely (e.g., laser-based communication medium).

In some embodiments, UV or UAV may have multiple wireless communication systems operating simultaneously, or available to back up the main link. This would be transparent to the higher-level communications systems disclosed herein.

In accordance with one aspect, there is provided an unmanned vehicle (UV). The UV may comprise a UAV, UGV, unmanned aquatic vehicle, or any robotic structure (including a fixed structure). The UV comprises a processor configured to control operations of the UV, a first and a second communication interface for connecting to a payload device, the first and second communication interfaces being of different types from each other, a third communication interface for communicating with a remote station, and a non-transitory memory device storing machine-readable instructions that, when executed by the processor, causes the processor to: receive through the third communication interface one or more data packets from the remote station, transmit the one or more data packets to the payload device through the first communication interface when the one or more data packets are designated for the first communication interface, and transmit the one or more data packets to the payload device through the second communication interface when the one or more data packets are designated for the second communication interface.

In accordance with another aspect, the first or second communication interface may include one of: Ethernet connection, Controller Area Network (CAN) Bus connection, serial connection, Inter-integrated Circuit (I2C) connection, printed circuit board (PCB) interface, USB connection, and a proprietary physical link.

In accordance with yet another aspect, the processor may be configured to transmit data packets from the payload device to the remote station through the third communication interface.

In accordance with still another aspect, the processor may be configured to determine that one of the one or more data packets is designated for the first or second communication interface based on a header of the one data packet.

In accordance with one aspect, the header may include a port number.

In accordance with another aspect, the processor may be configured to determine that one of the one or more data packets is designated for the first or second communication interface based on an IP address of the one data packet.

In accordance with yet another aspect, the processor may be configured to determine that the one data packet is designated for the first or second communication interface based on a subnet of the IP address of the one data packet.

In accordance with still another aspect, the processor may be configured to receive and authenticate an identity associated with a sender of the one or more data packets prior to transmitting any one of the one or more data packets to the payload device.

In accordance with one aspect, the first communication interface may be configured to transmit data packets other than control commands, and the second communication interface is configured to transmit control commands for controlling operations of the payload device.

In accordance with another aspect, the UV may include the payload device.

In accordance with yet another aspect, the communication module may cause the processor to: monitor a quality of service (QoS) score of a first communication channel associated with the first communication interface; and upon detecting that the QoS score is below a pre-determined threshold, transmit the one or more data packets to the payload device through the second communication interface when the one or more data packets are designated for the first communication interface.

In accordance with still another aspect, the communication module causes the processor to: monitor a quality of service (QoS) score of a second communication channel associated with the second communication interface; and upon detecting that the QoS score is below a pre-determined threshold, transmit the one or more data packets to the payload device through the first communication interface when the one or more data packets are designated for the second communication interface.

In accordance with one aspect, the header may include a port number.

In accordance with another aspect, a process for receiving and transmitting data by an unmanned vehicle (UV) is provided. The UV may comprise a UAV, UGV, unmanned aquatic vehicle, or any robotic structure (including a fixed structure). The UV comprises a first and a second communication interface for connecting to a payload device, and a third communication interface for communicating with a remote station. The first and second communication interfaces are of different types from each other. The process comprises receiving through the third communication interface one or more data packets from the remote station, transmitting the one or more data packets to the payload device through the first communication interface when the one or more data packets are designated for the first communication interface, and transmitting the one or more data packets to the payload device through the second communication interface when the one or more data packets are designated for the second communication interface.

In accordance with yet another aspect, the first or second communication interface may include one of: Ethernet connection, Controller Area Network (CAN) Bus connection, serial connection, Inter-integrated Circuit (I2C) connection, printed circuit board (PCB) interface, USB connection, and a proprietary physical link.

In accordance with still another aspect, the process may include transmitting data packets from the payload device to the remote station through the third communication interface.

In accordance with one aspect, the process may include determining one of the one or more data packets is designated for the first or second communication interface based on a header of the one data packet.

In accordance with another aspect, the header may include a port number.

In accordance with yet another aspect, the process may include determining one of the one or more data packets is designated for the first or second communication interface based on an IP address of the one data packet.

In accordance with still another aspect, the process may include determining the one data packet is designated for the first or second communication interface based on a subnet of the IP address of the one data packet.

In accordance with one aspect, the process may include receiving and authenticating an identity associated with a sender of the one or more data packets prior to transmitting any one of the one or more data packets to the payload device.

In accordance with another aspect, the first communication interface may be configured to transmit data packets other than control commands, and the second communication interface may be configured to transmit control commands for controlling operations of the payload device.

In accordance with yet another aspect, the process may include monitoring a quality of service (QoS) score of a first communication channel associated with the first second communication interface; and upon detecting that the QoS score is below a pre-determined threshold, transmitting the one or more data packets to the payload device through the second communication interface when the one or more data packets are designated for the first communication interface.

In accordance with still another aspect, the process may include monitoring a quality of service (QoS) score of a second communication channel associated with the second communication interface; and upon detecting that the QoS score is below a pre-determined threshold, transmitting the one or more data packets to the payload device through the first communication interface when the one or more data packets are designated for the second communication interface.

In accordance with one aspect, a remote station may be provided. The remote station comprises a processor, a communication interface for communicating with an unmanned vehicle (UV), and a non-transitory memory device storing machine-readable instructions that, when executed by the processor, cause the processor to receive or retrieve an input, process the input into one or more data packets for transmission to a payload device through the UV when the input is for the payload device connected to the UV, and transmit the one or more data packets to the UV through the communication interface for delivery to the payload device. The payload device is connected to the UV through at least two communication interfaces. The two communication interfaces are of different types from each other. The UV may comprise a UAV, UGV, unmanned aquatic vehicle, or any robotic structure (including a fixed structure).

In accordance with another aspect, the input may be received from a client device.

In accordance with yet another aspect, the processor may be configured to process the input into one or more data packets by encapsulating some or all of the input within the one or more data packet.

In accordance with still another aspect, the processor may be configured to process the input for transmission to the payload device through either a first or a second communication interface of the at least two communication interfaces based on a type of the input.

In accordance with one aspect, the processor may be configured to: when the input is determined to be a control command signal for the payload device, process the input for transmission to the payload device through the first communication interface; and when the input is determined to be a data signal other than a control command signal for the payload device, process the input for transmission to the payload device through the second communication interface.

In accordance with another aspect, a software development kit (SDK) may be provided. The SDK may be stored on a non-transitory computer readable medium for developing software applications for controlling an unmanned vehicle (UV) and a payload device connected to the UV. The UV may comprise a UAV, UGV, unmanned aquatic vehicle, or any robotic structure (including a fixed structure). The SDK comprises a first application programming interface (API) utilized in developing software applications at a remote station, and a second API utilized in developing the software applications at a remote station. The first API is configured to access the UV to obtain information regarding the UV. The second API is configured to access the payload device to obtain information regarding the payload device. The second API is configured to access the payload device through a communication interface between the remote station and the UV.

In accordance with still another aspect, the UAV may be connected to the payload device through a first and a second communication interfaces, the first and second communication interfaces being of different types from each other.

In accordance with one aspect, the first or second API may be configured to access the payload device through one of the first and second communication interfaces.

In accordance with another aspect, the first API may be configured to: receive, at the remote station, one or more data packets designated for the payload device; transmit the one or more data packets to the payload device through the first communication interface when the one or more data packets are designated for the first communication interface; and transmit the one or more data packets to the payload device through the second communication interface when the one or more data packets are designated for the second communication interface.

In accordance with yet another aspect, the SDK may provide a graphical user interface for displaying at least one area for entering user input.

In accordance with still another aspect, the user input may include control command for the UAV or the payload device.

The embodiments of the devices, systems and processes described herein may be implemented in a combination of both hardware and software. These embodiments may be implemented on programmable computers, each computer including at least one processor, a data storage system (including volatile memory or non-volatile memory or other data storage elements or a combination thereof), and at least one communication interface.

Program code is applied to input data to perform the functions described herein and to generate output information. The output information is applied to one or more output devices. In some embodiments, the communication interface may be a network communication interface. In embodiments in which elements may be combined, the communication interface may be a software communication interface, such as those for inter-process communication. In still other embodiments, there may be a combination of communication interfaces implemented as hardware, software, and combination thereof.

Throughout the foregoing discussion, numerous references may be made regarding control and computing devices. It should be appreciated that the use of such terms may represent one or more computing devices having at least one processor configured to execute software instructions stored on a computer readable tangible, non-transitory medium. For example, a remote station 160 or 105 may have a server that includes one or more computers coupled to a web server, database server, or other type of computer server in a manner to fulfill described roles, responsibilities, or functions.

The foregoing discussion provides many example embodiments. Although each embodiment represents a single combination of inventive elements, other examples may include all possible combinations of the disclosed elements. Thus if one embodiment comprises elements A, B, and C, and a second embodiment comprises elements B and D, other remaining combinations of A, B, C, or D, may also be used.

The term "connected" or "coupled to" may include both direct coupling (in which two elements that are coupled to each other contact each other) and indirect coupling (in which at least one additional element is located between the two elements).

The technical solution of embodiments may be in the form of a software product instructing physical operations, such as controlling movement of the UAV 125, for example. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the processes provided by the embodiments.

The embodiments described herein are implemented by physical computer hardware, including computing devices, servers, receivers, transmitters, processors, memory, displays, and networks. The embodiments described herein provide useful physical machines and particularly configured computer hardware arrangements. The embodiments described herein are directed to electronic machines and processes implemented by electronic machines adapted for processing and transforming electromagnetic signals which represent various types of information. The embodiments described herein pervasively and integrally relate to machines, and their uses; and the embodiments described herein have no meaning or practical applicability outside their use with computer hardware, machines, and various hardware components. Substituting the physical hardware particularly configured to implement various acts for non-physical hardware, using mental steps for example, may substantially affect the way the embodiments work. Such computer hardware limitations are clearly essential elements of the embodiments described herein, and they cannot be omitted or substituted for mental means without having a material effect on the operation and structure of the embodiments described herein. The computer hardware is essential to implement the various embodiments described herein and is not merely used to perform steps expeditiously and in an efficient manner.

The processor or controller 155, ground station 160, or client device 105 may be implemented as a computing device with at least one processor, a data storage device (including volatile memory or non-volatile memory or other data storage elements or a combination thereof), and at least one communication interface. The computing device components may be connected in various ways including directly coupled, indirectly coupled via a network, and distributed over a wide geographic area and connected via a network (which may be referred to as "cloud computing").

For example, and without limitation, the computing device may be a server, network appliance, microelectromechanical Systems (MEMS) or micro-size mechanical devices, set-top box, embedded device, computer expansion module, personal computer, laptop, personal data assistant, cellular telephone, smartphone device, UMPC tablets, video display terminal, gaming console, electronic reading device, and wireless hypermedia device or any other computing device capable of being configured to carry out the processes described herein.

A processor may be, for example, a general-purpose microprocessor or microcontroller, a digital signal processing (DSP) processor, an integrated circuit, a field programmable gate array (FPGA), a reconfigurable processor, a programmable read-only memory (PROM), or any combination thereof.

Data storage device may include a suitable combination of any type of computer memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like.

Computing device may include an I/O interface to enable computing device to interconnect with one or more input devices, such as a keyboard, mouse, camera, touch screen and a microphone, or with one or more output devices such as a display screen and a speaker.

Although the embodiments have been described in detail, it should be understood that various changes, substitutions and alterations can be made herein without departing from the scope as defined by the appended claims.

Moreover, the scope of the present application is not intended to be limited to the particular embodiments of the process, machine, manufacture, composition of matter, means, processes and steps described in the specification. As one of ordinary skill in the art will readily appreciate from the disclosure of the present invention, processes, machines, manufacture, compositions of matter, means, processes, or steps, presently existing or later to be developed, that perform substantially the same function or achieve substantially the same result as the corresponding embodiments described herein may be utilized. Accordingly, the appended claims are intended to include within their scope such processes, machines, manufacture, compositions of matter, means, processes, or steps.

As can be understood, the examples described above and illustrated are intended to be exemplary only. The scope is indicated by the appended claims.

The invention claimed is:

1. An unmanned vehicle (UV), comprising:
 a processor configured to control operations of the UV;
 a first and a second communication interface for connecting to a payload device when the payload device is carried by the UV, the first and second communication interfaces being of different types from each other;
 a third communication interface for communicating with a remote station; and
 a non-transitory memory device storing machine-readable instructions that, when executed by the processor, cause the processor to receive and transmit data, the processor configured to, when the first and second interfaces are connected to the payload device:
  receive, through the third communication interface, one or more data packets from the remote station for transmission to the payload device, wherein receiving the one or more data packets comprises receiving one or more headers associated with the one or more data packets, each received data packet being associated with one of the one or more headers and being designated, based on the associated header, for the first communication interface or the second communication interface;
monitor a quality of service (QoS) of a first communication channel associated the first communication interface, to detect whether or not the QoS is below a predetermined threshold;
upon detecting that the QoS is not below a predetermined threshold:
transmit the one or more data packets to the payload device through the first communication interface when the one or more data packets are designated for the first communication interface, the first communication interface delivering the one or more data packets to the payload device; and
transmit the one or more data packets to the payload device through the second communication interface when the one or more data packets are designated for the second communication interface, the second communication interface delivering the one or more data packets to the payload device;
upon detecting that the QoS of the first communication channel is below the pre-determined threshold, when the one or more data packets are associated with the first communication channel and designated for the first communication interface, transmit the one or more data packets to the payload device through the second communication interface, the second communication interface delivering the one or more data packets to the payload device;
wherein one of the first and second communication interfaces is configured to transmit data packets other than control commands, and the other one of the first and second communication interfaces is configured to transmit control commands for controlling operations of the payload device.

2. The UV as claimed in claim 1, wherein:
the first and second communication interfaces comprises logical interfaces implemented through at least one hardware interface;
at least one of the first communication interface or the second communication interface comprises one of: Ethernet connection, Controller Area Network (CAN) Bus connection, serial connection, Inter-integrated Circuit ($I2^C$) connection, printed circuit board (PCB) interface, USB connection, a proprietary physical link, or a wireless connection; and
the UV includes the payload device.

3. The UV as claimed in claim 1, wherein the processor is configured to transmit data packets from the payload device to the remote station through the third communication interface; and
the processor is configured to receive and authenticate an identity associated with a sender of the one or more data packets prior to transmitting any one of the one or more data packets to the payload device.

4. The UV as claimed in claim 1, wherein:
the first communication interface is an Ethernet interface; and
the second communication interface is a Controller Area Network (CAN) Bus interface.

5. The UV as claimed in claim 1, wherein each received data packet is designated for the first or second communication interface based on a port number in the associated header.

6. The UV as claimed in claim 1, wherein each received data packet is designated for the first or second communication interface based on an IP address in the associated header.

7. The UV as claimed in claim 6, wherein each data packet is designated for the first or second communication interface based on a subnet of the IP address in the associated header.

8. The UV as claimed in claim 1, wherein:
the one of the first and second communication interfaces that is configured to transmit data packets other than the control commands is faster, and more lossy, than the other one of the first and second communication interfaces.

9. The UV as claimed in claim 1, wherein:
the first communication interface is a Controller Area Network (CAN) Bus interface; and
the second communication interface is an Ethernet interface.

10. A process for receiving and transmitting data by an unmanned vehicle (UV), the UV comprising a first and a second communication interface for connecting to a payload device, and a third communication interface for communicating with a remote station, the first and second communication interfaces being of different types from each other, the process comprising:
receiving, through the third communication interface, one or more data packets from the remote station, each received data packet comprising a header based on which the data packet is designated for the first communication interface or the second communication interface;
monitoring a quality of service (QoS) of a first communication channel associated with one of the first and second communication interfaces, to detect whether or not the QoS is below a predetermined threshold;
upon detecting that the QoS is not below a predetermined threshold:
transmitting the one or more data packets to the payload device through the first communication interface when the one or more data packets are designated for the first communication interface, the first communication interface delivering the one or more data packets to the payload device; and
transmitting the one or more data packets to the payload device through the second communication interface when the one or more data packets are designated for the second communication interface, the second communication interface delivering the one or more data packets to the payload device;
upon detecting that the QoS is below the pre-determined threshold, when the one or more data packets are associated with the first communication channel and designated for the associated one of the first and second communication interfaces, transmitting the one or more data packets to the payload device through the other of the first and second communication interfaces;
wherein the first communication interface is configured to transmit data packets other than control commands, and the second communication interface is configured to transmit control commands for controlling operations of the payload device.

11. The process as claimed in claim 10, wherein the first and second communication interfaces comprises logical interfaces implemented through at least one hardware interface;
wherein at least one of the first communication interface or the second communication interface comprises one of: Ethernet connection, Controller Area Network (CAN) Bus connection, serial connection, Inter-integrated Circuit (I2$^C$) connection, printed circuit board (PCB) interface, USB connection, and a proprietary physical link.

12. The process as claimed in claim 10, wherein:
the first communication interface is an Ethernet interface; and
the second communication interface is a Controller Area Network (CAN) Bus interface.

13. The process as claimed in claim 10, wherein each received data packet is designated for the first or second communication interface based on a port number in the data packet's header.

14. The process as claimed in claim 10, wherein each received data packet is designated for the first or second communication interface based on an IP address of the data packet's header.

15. The process as claimed in claim 14, wherein each received data packet is designated for the first or second communication interface based on a subnet of the IP address of the data packet's header;
wherein the process comprises receiving and authenticating an identity associated with a sender of the one or more data packets prior to transmitting any one of the one or more data packets to the payload device.

16. The process as claimed in claim 8, wherein the first communication interface is configured to transmit data packets other than control commands, and the second communication interface is configured to transmit control commands for controlling operations of the payload device.

17. The process as claimed in claim 10, wherein the first communication interface is faster, and more lossy, than the second communication interface.

18. A remote station configured to communicate with the unmanned vehicle of claim 1, the remote station comprising:
a processor;
a communication interface for communicating with the unmanned vehicle (UV), wherein the remote station is not part of the UV and is located at a distance from the UV; and
a non-transitory memory device storing machine-readable instructions that, when executed by the processor, causes the processor of the remote station to receive and transmit data, the processor of the remote station being configured to:
receive or retrieve an input;
process the input into one or more data packets for transmission to the payload device through the UV when the input is for the payload device connected to the UV; and
transmit the one or more data packets to the UV through the communication interface for delivery to the payload device.

19. The remote station as claimed in claim 18, wherein the input is received from a client device;
wherein the processor is configured to process the input into one or more data packets by encapsulating some or all of the input within the one or more data packet;
wherein the processor is configured to process the input for transmission to the payload device through either a first or a second communication interface of the at least two communication interfaces based on a type of the input;
wherein the remote station further comprises a software development kit (SDK) stored on the non-transitory computer readable medium for developing software applications for controlling an unmanned vehicle (UV) and a payload device connected to the UV, the SDK comprising:
a first application programming interface (API) utilized in developing software applications at the remote station, the first API configured to access the UV to obtain information regarding the payload device;
wherein the first API is configured to access the payload device through a communication interface between the remote station and the UV.

20. The remote station as claimed in claim 19, wherein the remote station is a ground station, and the processor is configured to:
when the input is determined to be a control command signal for the payload device, process the input for transmission to the payload device through the first communication interface; and
when the input is determined to be a data signal other than a control command signal for the payload device, process the input for transmission to the payload device through the second communication interface.

* * * * *

UNITED STATES PATENT AND TRADEMARK OFFICE
CERTIFICATE OF CORRECTION

| | |
|---|---|
| PATENT NO. | : 11,909,552 B2 |
| APPLICATION NO. | : 17/079376 |
| DATED | : February 20, 2024 |
| INVENTOR(S) | : Christopher E. Prest et al. |

It is certified that error appears in the above-identified patent and that said Letters Patent is hereby corrected as shown below:

In the Specification

In the DETAILED DESCRIPTION:

Column 22, Line 18, change "a WindowsTM operating" to --a Windows™ operating--.

In the Claims

Claim 2, Column 29, Line 46, change "($I2^C$) connection," to --($I^2C$) connection,--.

Claim 11, Column 31, Line 3, change "($I2^C$) connection," to --($I^2C$) connection,--.

Signed and Sealed this
Ninth Day of April, 2024

*Katherine Kelly Vidal*

Katherine Kelly Vidal
*Director of the United States Patent and Trademark Office*